(12) United States Patent
Herbstritt

(10) Patent No.: US 7,260,906 B1
(45) Date of Patent: Aug. 28, 2007

(54) REVERSE-ROTATION DISPLAYS

(75) Inventor: Roger Herbstritt, 636 Marshall Rd., Vienna, VA (US) 22180

(73) Assignee: Roger Herbstritt, Vienna, VA (US)

( * ) Notice: Subject to any disclaimer, the term of this patent is extended or adjusted under 35 U.S.C. 154(b) by 0 days.

(21) Appl. No.: 11/286,749

(22) Filed: Nov. 25, 2005

(51) Int. Cl.
*G09F 13/00* (2006.01)

(52) U.S. Cl. .......................... 40/431; 434/301; 40/426

(58) Field of Classification Search ............. 40/426
See application file for complete search history.

(56) References Cited

U.S. PATENT DOCUMENTS

| | | | |
|---|---|---|---|
| 3,550,316 A * | 12/1970 | MacPherson | ............. 446/133 |
| 3,919,795 A | 11/1975 | Jinivasian et al. | |
| 4,011,674 A | 3/1977 | Jacobson | |
| 4,012,038 A | 3/1977 | Brotz | |
| 4,192,563 A | 3/1980 | Levkovitch | |
| 5,137,487 A | 8/1992 | Hall, Jr. | |
| 5,232,105 A | 8/1993 | Gregg | |
| 5,589,721 A * | 12/1996 | Han et al. | ................ 310/90.5 |
| 5,695,344 A * | 12/1997 | Tomasello | ................ 434/281 |
| 6,250,798 B1 | 6/2001 | Brainard et al. | |
| 6,705,794 B2 | 3/2004 | Varner | |
| 6,853,283 B1 | 2/2005 | French | |
| 6,937,125 B1 | 8/2005 | French | |
| 2002/0148147 A1* | 10/2002 | Francis | ..................... 40/426 |

* cited by examiner

*Primary Examiner*—Joanne Silbermann
(74) *Attorney, Agent, or Firm*—Baker Botts L.L.P.

(57) ABSTRACT

Reverse-Rotation Displays produce unexpected motion. They are especially useful for teaching high school and college students principles of the physical sciences. In addition, these Displays can be used for commercial and noncommercial purposes. Another use involves the design of special purpose flywheels that are capable of storing energy and/or converting rotational speed. The Displays move in the forward direction because of a motor. They move in the reverse direction because of forces that come from magnets embedded in a Display, and the Earth's magnetic field.

14 Claims, 17 Drawing Sheets

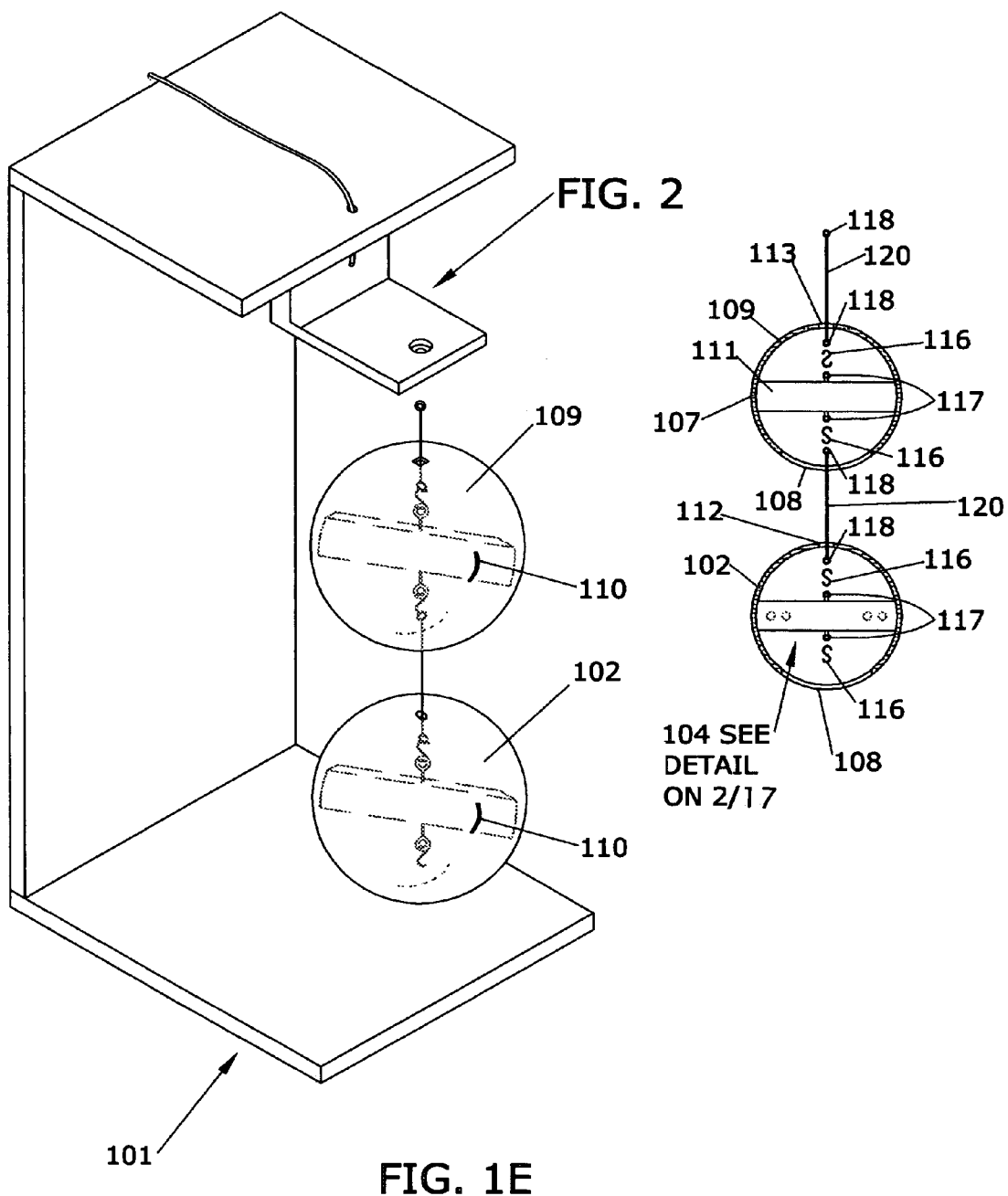

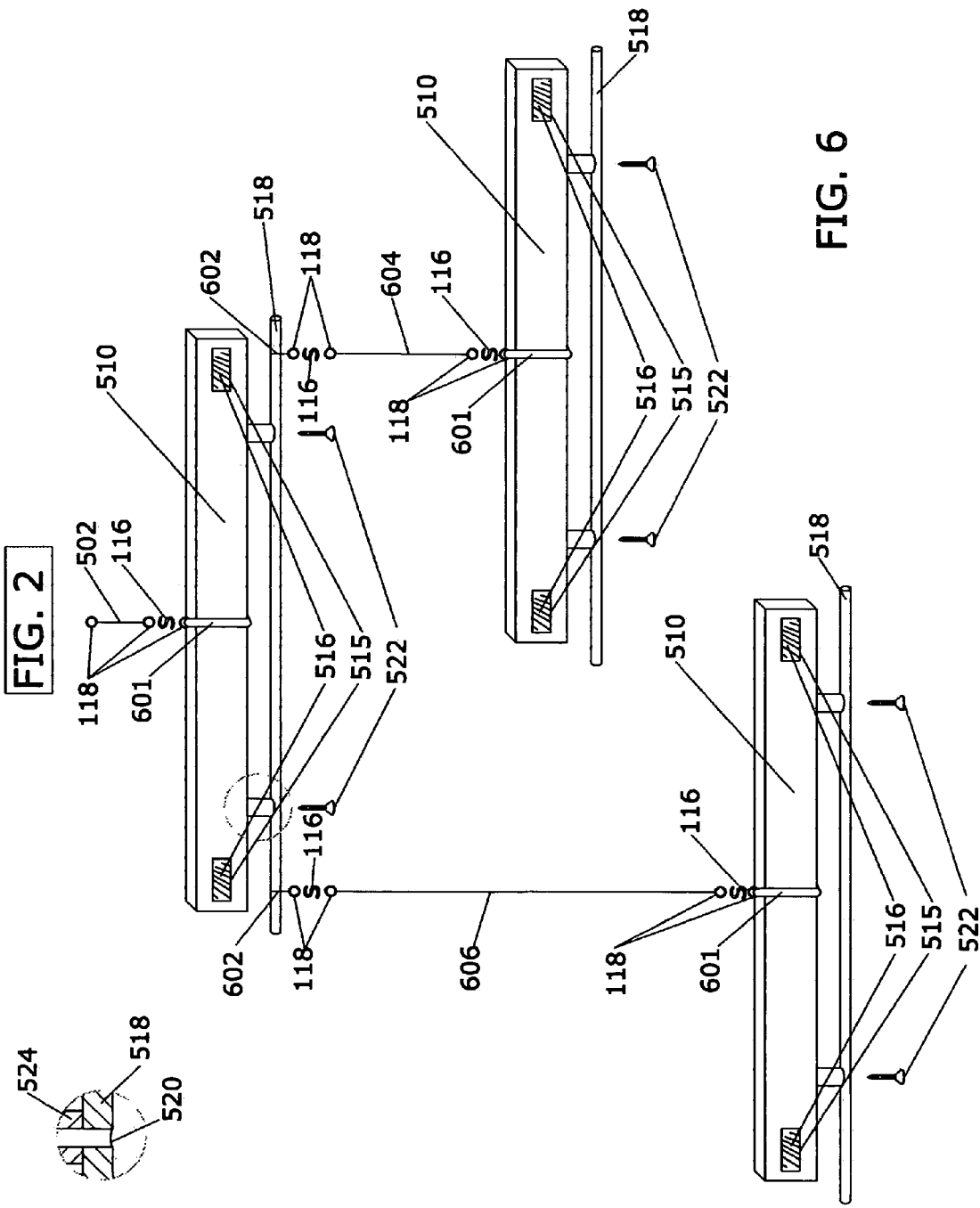

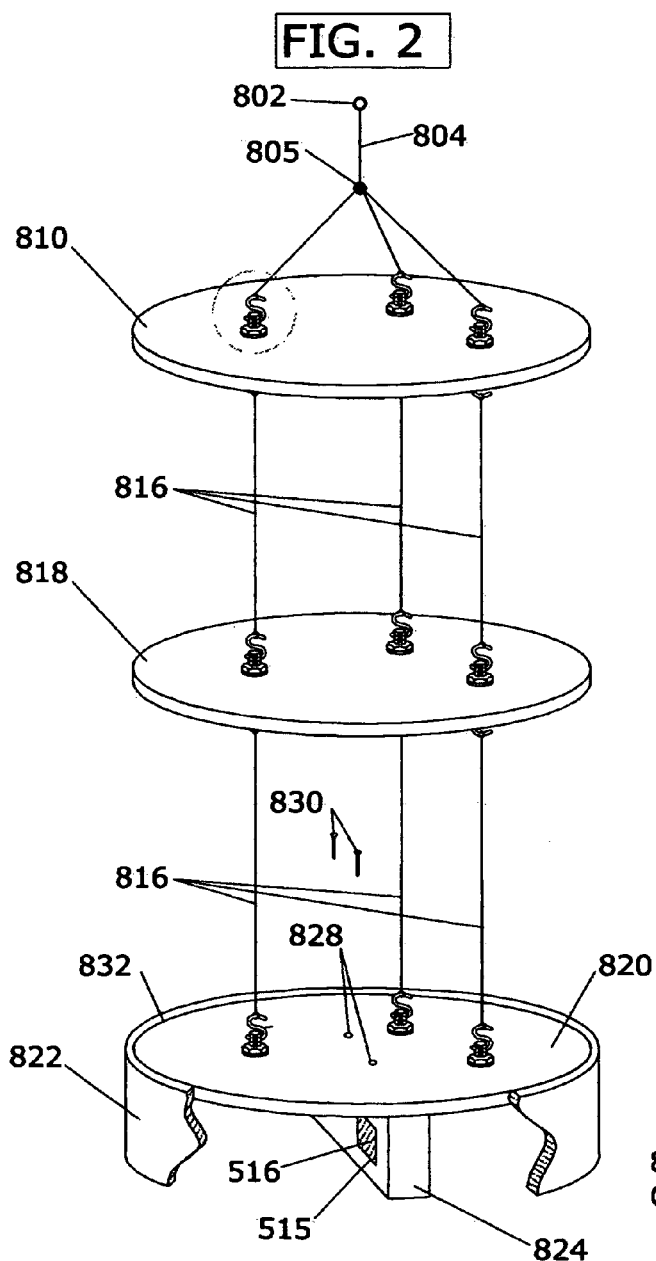
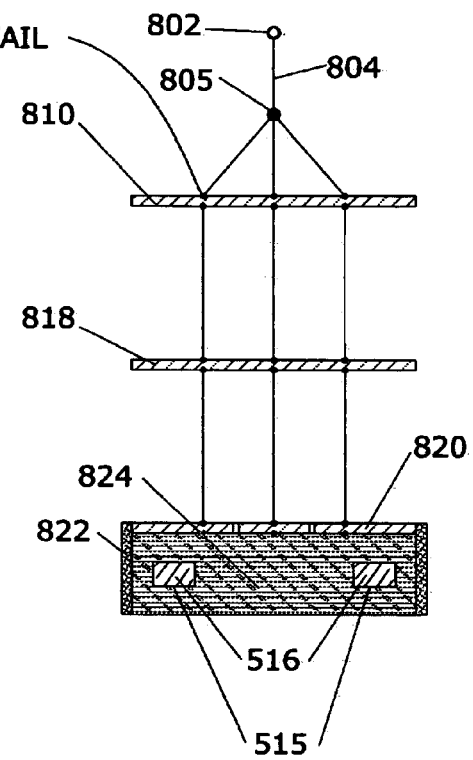
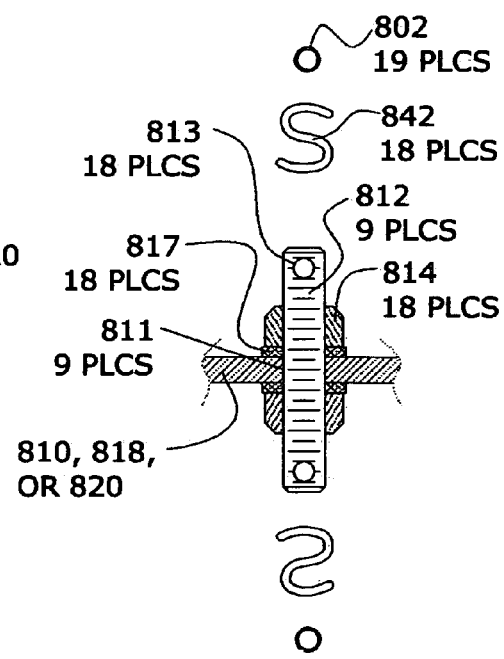
FIG. 8A

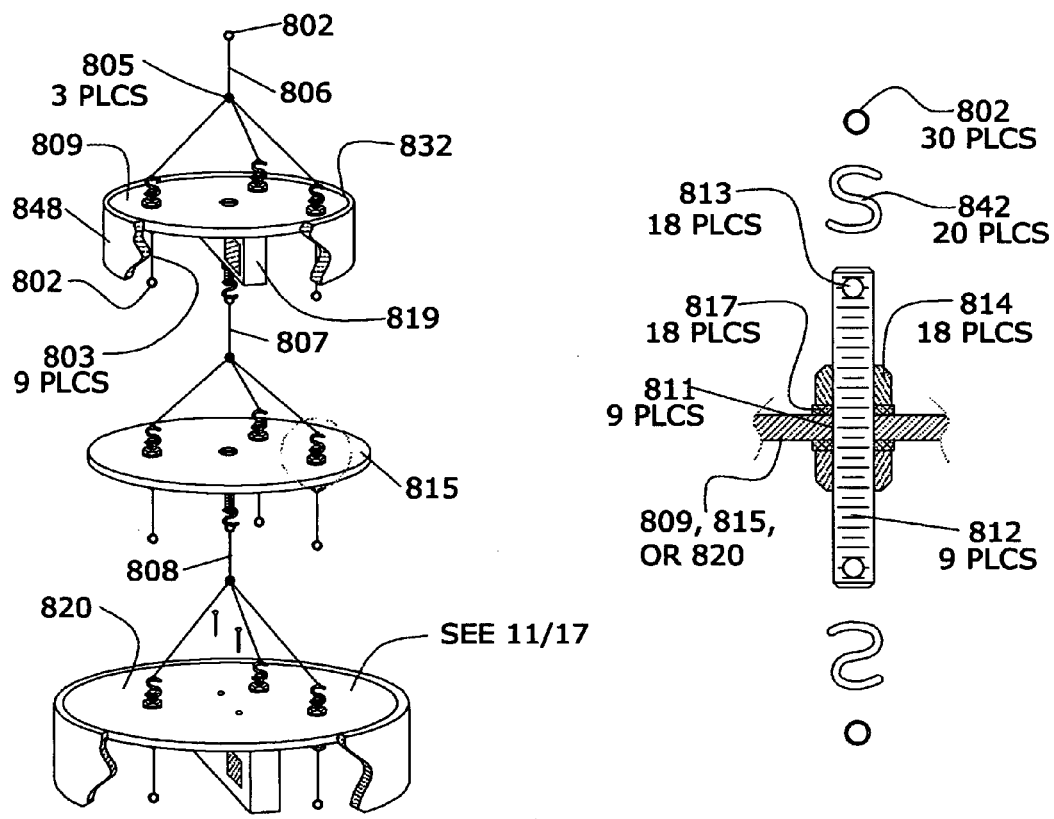
FIG. 8B
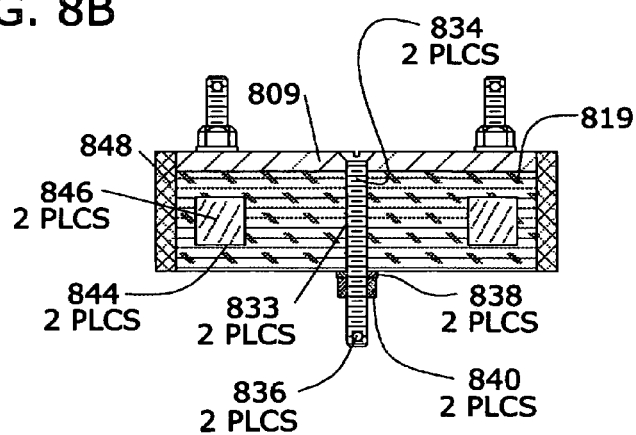

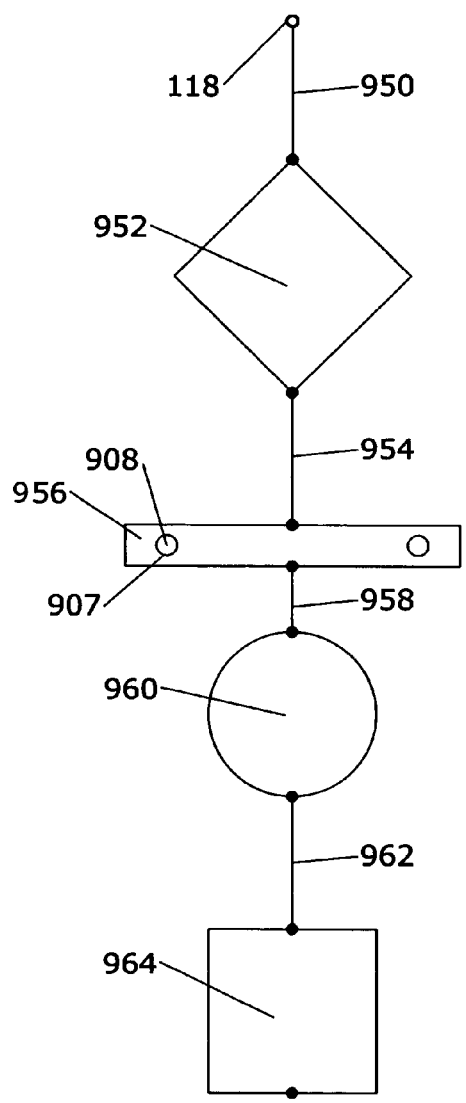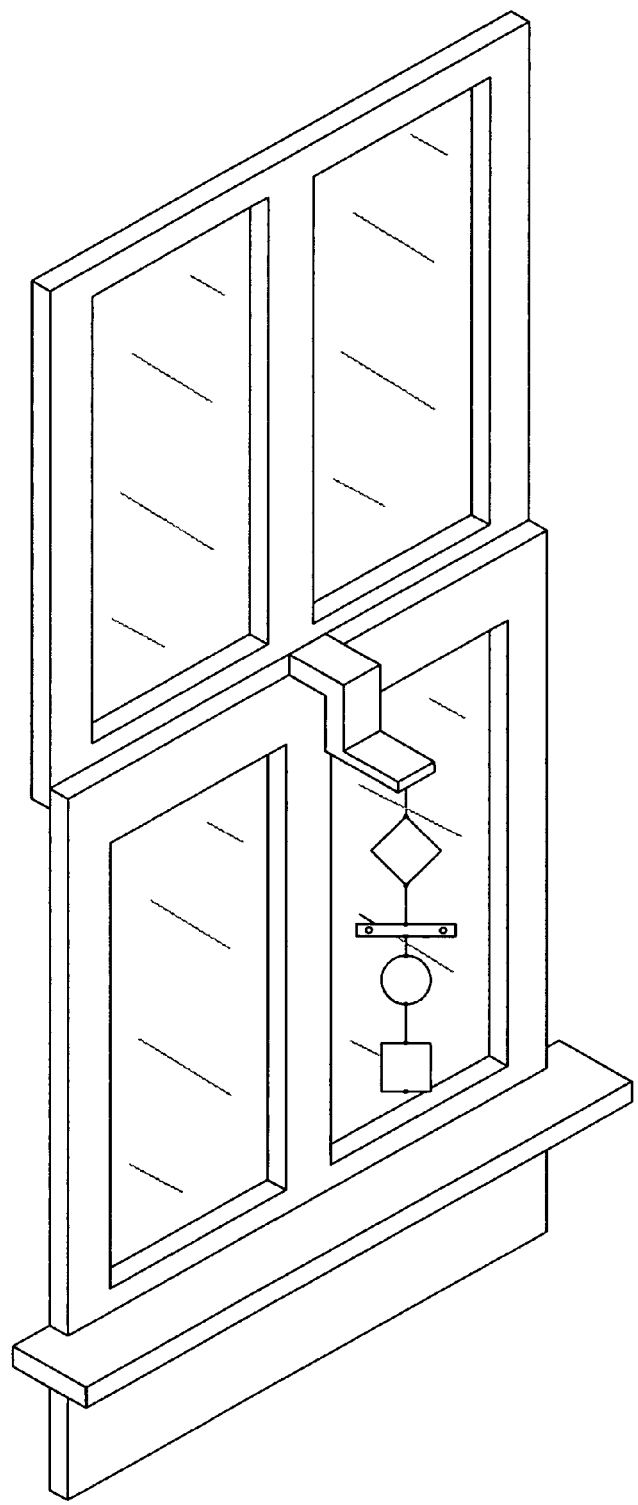
FIG. 9B

REVERSE-ROTATION DISPLAYS

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

The present invention relates to Reverse-Rotation Displays, and, more particularly, to Reverse-Rotation Displays that produce variable rotational speeds.

2. Prior Art

There is something very special about how the eyes and the brain perceive moving objects. Things that move always captivate us; they demand our attention. That's easy to see by watching a cat play with a ball. Motion, of all kinds, is used in a wide range of activities. However, the motion of interest here is rotational motion for education and certain other uses. Rotational motion, typically, has the advantage of being able to accomplish specific objectives in a limited space. Examples are easily seen in store windows where rotating displays are common.

U.S. Pat. No. 3,919,795 to Jinivisian et al. (1975) describes a motorized mobile for use over a child's bed or crib. That patent includes a motor for driving a mobile. The direction of rotation is determined by the construction of the mobile. Operation in the reverse direction is not possible.

U.S. Pat. No. 5,232,105 to Gregg (1993), and U.S. Pat. No. 6,250,798 to Brainard et al. (2001), use motors to rotate crystals to redirect sunlight within a room. These displays are used to entertain, or for aesthetic purposes. In both cases, the crystals always move in the direction that the motor turns. There are at least two ways to overcome this limitation; both would make the displays more expensive. First, provide the added feature that would allow the motor to reverse direction at regular intervals. Second, add a second display: one to rotate the crystals clockwise; one to rotate them counterclockwise. Its likely neither would be pragmatic.

Two U.S. patents issued to French, U.S. Pat. No. 6,853,283 (2005), and U.S. Pat. No. 6,937,125 (2005), involve self-powered spherical displays. Those patents show two concentric hollow spheres separated by a transparent fluid. The spheres define the inventions. The only external force tolerated by the inner sphere is a magnetic force. Mechanical contact, from outside the two concentric spheres, to the inner sphere, would throw the "self-powered moving display" into disorder. For example, if the inner sphere of one display was mechanically coupled to the inner sphere of another display, neither display would function.

Please Note: The term Display(s) is used throughout this application to mean Reverse-Rotation Display(s).

OBJECTS AND ADVANTAGES

This invention is intended to be used for:

teaching high school and college students principles of the physical sciences, showing articles for commercial or noncommercial purposes, and special purpose flywheels.

The primary purpose of this invention is to help students grasp fundamental concepts in science. Here is a short list of terms associated with these Displays: force, rotation, momentum, torque, torsion, inertia, Earth's magnetic field, magnetostatics, Coulomb's law, and paleomagnetism.

All materials used are inexpensive and readily available. The Displays described produce unexpected rotational motion. They have several peculiar characteristics. First, they rotate as a result of being connected to a motor, but their rotational speed can be more than 100 times the speed of the motor. Second, in spite of the fact that the motor runs at a constant speed, they often stop. A Display can come to a complete stop more than ten times in a ten minute period. And third, they rotate—for a portion of the time—in a direction opposite to the motor rotation. Regarding this last point, measured data shows reverse-rotation time can be greater than 40% of operating time.

Teaching science is challenging. However, when teachers use methods and equipment that capture the imagination of students, the challenge can be a joy. It is well known that excellence in education is made possible by motivated teachers and students. Certainly, this highly desirable characteristic of motivation in the classroom is more important than the size of a school, or the size of a school budget. And, the consequence of such motivation is valuable to students, teachers, parents, and the world. More generally, it is hoped that, this, and all education, will lead to a deeper experience of what it means to be human. Effective learning gives students an understanding that lasts well beyond the end of a science course. Too often, students have forgotten concepts that were learned only weeks earlier.

Science, in part, is defined as, "knowledge covering general truths as obtained and tested through scientific method." And, "scientific method" is defined as, "principles and procedures for the systematic pursuit of knowledge involving the recognition and formulation of a problem, the collection of data through observation and experiment, and the formulation and testing of hypotheses." Students who probe the depths of these Displays will have good opportunity to use "scientific notation" which is defined as, "a widely used floating-point system in which numbers are expressed as products consisting of a number between 1 and 10 multiplied by an appropriate power of 10." (The above definitions are from Webster's New Collegiate Dictionary.)

The best way to teach anything is to make it interesting and fun. Everyone benefits when subjects are taught that way. More learning takes place where those characteristics are present. (Its likely, the reason field trips are so popular among students, and teachers, is because they are interesting and fun.) Its true that many high school and college students graduate with little understanding of science, especially the physical sciences. One of the purposes of the preferred embodiment is to make science interesting and fun.

For a person to understand the fundamentals of music, mathematics, physics, etc., requires study. In the physical sciences, there is a need to become familiar with the ways of science. And, it is well known, science guards its secrets. In order to progress in learning, dedication and perseverance are needed. One significant advantage that some students have is excellent teachers. Perhaps, the next best things to that, since there is always a shortage of such teachers, are excellent books and laboratory equipment. In the best circumstances, teachers, books, and equipment, work together so students understand the subject being taught. When that happens, a person can become intimately familiar with the basic concepts involved. This learning is of real benefit when students are confronted again in more advanced courses, or upon completion of school work, they can then build on what was previously learned.

The following are highly beneficial for student progress:
a receptive, motivated, and healthy student,
a competent teacher who is also motivated and healthy,
a classroom environment that is conducive to learning, and
excellent equipment that provides the student with a clear understanding of the subject matter.

Some of the principles associated with these Displays are complex. However, science teachers can plan their presentations, and laboratory exercises, so a portion is covered in a particular course. Then, following courses can progressively treat the more complex issues. Indeed, there are aspects of this invention that can prove challenging in graduate school. Starting in grade 11, students would benefit from a plan that provided yearly exposure to the principles involved.

Science students should be challenged to combine theory and observation in a way that provides insight into the complex nature of the subject matter. Those students would be asked to:
1) Calculate and measure the torque and torsion involved. Then find ways to predict those forces as parameters are changed.
2) Use the ideas involved to find practical solutions to existing, and future, problems.
3) Find ways to develop better educational aids.

One of the best ways of learning is by building on concepts that are already familiar to a person. There are many areas in the physical sciences where students can benefit by observing fairly simple experiments. It is not uncommon for students to embark on their life's work because of favorable insights gained in high school science classes that demonstrate fundamental concepts.

This invention began with an observation that occurred during work on a completely unrelated activity. It did not start with a problem or question. However, it was natural that problems and questions followed the progress of the invention. In time, one question stood out: Was it possible to use these Displays to assist students in learning certain concepts in the physical sciences? The preferred embodiment provides a positive answer to the question.

Then, other questions came into focus. Was it possible to construct a Display for garments and other articles that would rotate in an unusual way? Suppose a person was looking in a store window, and saw a coat rotating slowly in one direction. That would not be unexpected, since objects normally rotate in only one direction. To continue with the above question: Was there an inexpensive way to produce motion that permits rotation in both directions (clockwise and counter-clockwise), and at continually changing speed? The answer to both questions was "yes". The following pages specify the requirements for doing this.

The designing and testing of Displays led to the possibility of another fundamental design of these devices: special purpose flywheels.

The observation, mentioned above, involved watching a wood dowel rotate. A summary of what happened follows. While working on a project that involved small magnets, I took a foot long wood dowel that was ¼" in diameter, and taped a magnet to each end. The combination was hung, by a string attached to the mid-point of the dowel—so it could rotate in a horizontal plane—from a hook fixed to the shaft of a low speed overhead motor. The length of the dowel rotated in a horizontal plane. Perhaps an hour passed, and there was nothing unusual about the motion of the dowel. After a while, one of the magnets was reversed. Again, some time passed. I then noticed that the dowel had stopped turning. My first thought was the motor had stopped. But the motor had not stopped. The dowel then began to move in the direction opposite to the motor shaft. After the dowel traveled about half a rotation, it stopped again. In a few seconds, it began to move in the same direction as the shaft. These observations caused me to become attentive to what was happening.

Subsequently, the dowel went in the direction of the shaft for about ten rotations, and then stopped. And the above pattern repeated. Immediately, it appeared there was some spurious reason for this odd behavior. So, in order to get away from influences in the building where the observations were being made, I built a test structure outside. It was intentionally placed 50 feet from anything made of materials that would attract a magnet. The structure was made of wood. No nails or screws were used. It was seven feet high. Underneath was clay earth that was not attracted to a magnet. The equipment was moved to the new test structure. Tests were run. The dowel behaved like it did when it was in the building.

More tests were run after making certain no other unusual circumstances existed. The observations made can be summarized as follows.

When the dowel had no magnets attached, it followed the motor shaft. If the string between the dowel and the motor shaft was less than five inches long, the dowel followed the motor shaft very closely. When the string was ten or twenty inches long, there was a lag in the dowel rotation. With no magnets, the dowel never stopped.

When the magnet on one end of the dowel was positioned so the north-seeking pole was facing north, and the magnet on the other end had its south-seeking pole facing north, the dowel never stopped, even if the test ran for an hour or more. (The string was tied to the mid-portion of the dowel, and the dowel rotated in a horizontal plane.)

When the dowel was configured in a way that both ends had magnets with north-seeking poles on the same side of the dowel, the dowel stopped at regular intervals.

The items below are listed in the time sequence they occurred.
1) A horizontal dowel, with a magnet on each end, was hung at its mid-point by a string, to the shaft of a low speed motor. As the motor turned, the dowel rotated in a way that showed some irregular motion. But the dowel, over time, always went in the same direction the motor turned.
2) When one of the magnets was reversed, the dowel exhibited peculiar motion. But, little attention was paid to it. That's because another activity was underway which had nothing to do with a rotating dowel and magnets. As time passed, it was noted that there seemed to be a pattern to the rotation. And, most important, there were times the dowel would stop. After that, it would rotate for a while in the direction opposite to the motor. Upon examination it was learned that both magnets were positioned on the dowel with their similar poles on the same side.
3) Then another dowel, with nonmagnetic weights on the ends was tested. It rotated in a way that simply followed the motor.

4) In the following weeks, conditions were identified that related to the fundamental operation of these Displays. The parameters involved were: motor speed, suspension characteristics, frame characteristics, magnet strength, and distance between magnets.

Starting with the above reference to "frame", that term will be used from here on in place of the more narrow term dowel. Frame is used to identify that part of a Display that rotates in a horizontal plane. As a minimum a frame must consist of:
- an appropriate size piece of nonmagnetic material (nonmagnetic: absence of magnetic properties),
- a place where a suspension is attached (usually at midpoint),
- one or more magnets.

Of the test models that were constructed and evaluated, one group was believed to be useful for teaching science. Another group could be used to display garments or other items. Then, after considerable testing, a new and completely unexpected use became apparent: special purpose flywheels. Each of these three kinds of Displays is included in this application.

SUMMARY

In accordance with the present invention, there are provided Reverse-Rotation Displays that produce unexpected motion. The Displays are intended to be used for: teaching high school and college students principles of the physical sciences; showing articles for commercial and noncommercial purposes; and special purpose flywheels. The Displays use materials that are inexpensive and readily available.

BRIEF DESCRIPTION OF THE DRAWINGS

A complete understanding of the present invention may be obtained by reference to the accompanying drawings, when considered in conjunction with the subsequent, detailed description, in which:

FIG. 6 is a perspective view of an assembly of three suspended frames for displaying articles.

FIG. 8A is a perspective view of three suspended shelves that move together.

FIG. 8B is a perspective view of three suspended shelves that move independently.

FIG. 9B is a perspective view of three suspended crystals and a frame.

Figure 1A:
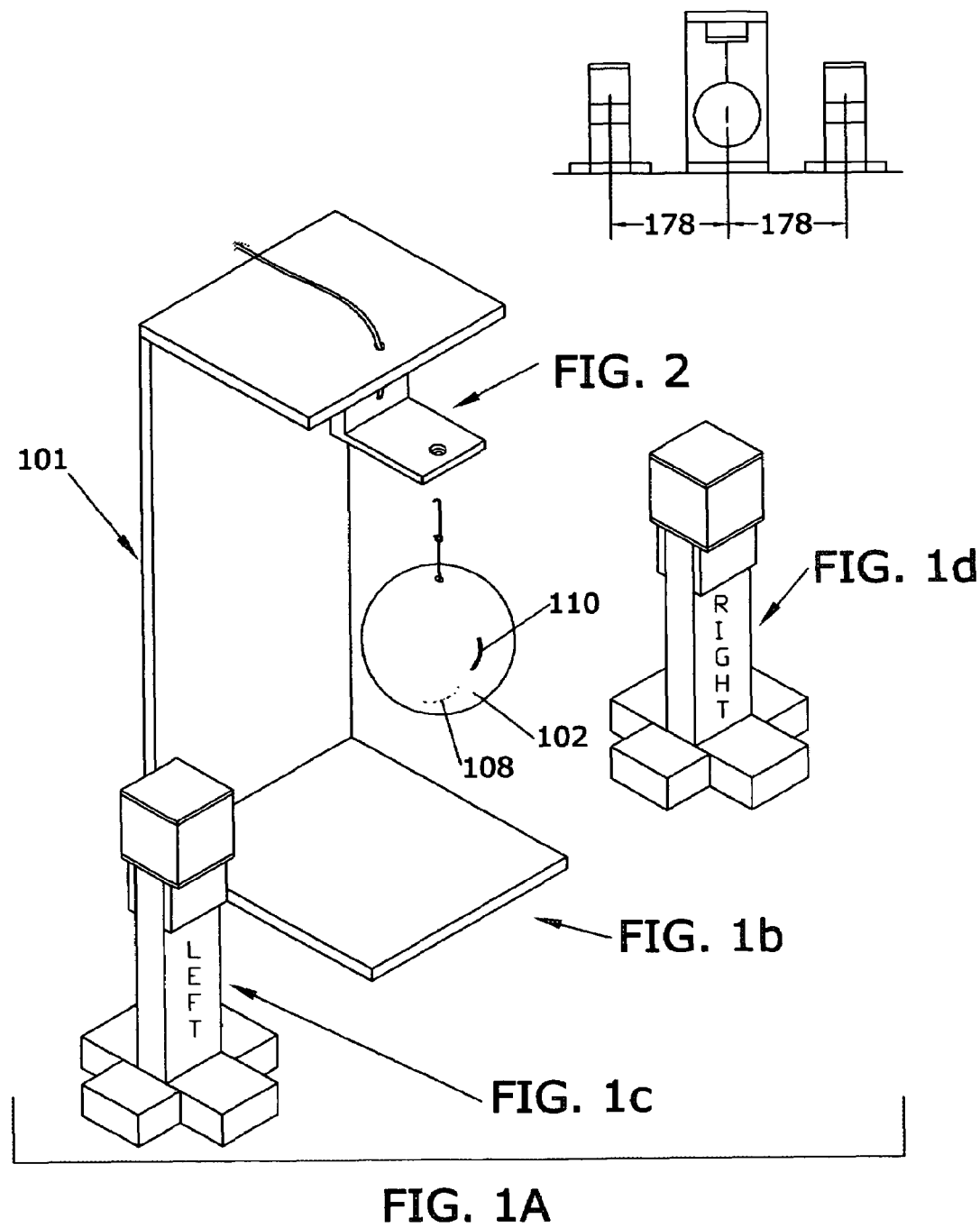
FIG. 1A is a perspective view of a ball suspended in a portable stand with two side stands (including FIG. 1b, FIG. 1c, and FIG. 1d).

For purposes of clarity and brevity, like elements and components will bear the same designations and numbering throughout the Figures. In the drawings, all reference numerals, no matter where they appear, have numbers that indicate where they first appeared. For example, on FIG. 7, where numbers are generally in the 700's, reference numeral, 118, indicates it first appeared on FIG. 1b.

| DRAWINGS - Reference Numerals | |
|---|---|
| 101 | portable stand |
| 102 | ball |
| 104 | frame |
| 104a | base |
| 104b | cover |
| 104c | adhesive |
| 105 | hole |
| 106 | magnet |
| 107 | end |
| 108 | incision |
| 109 | ball |
| 110 | line |
| 111 | frame |
| 112 | round hole |
| 113 | square hole |
| 116 | hook |
| 117 | eye |
| 118 | ring |
| 120 | suspension |
| 121 | hanger |
| 124 | top |
| 126 | power cord |
| 128 | hole |
| 130 | back |
| 132 | bottom |
| 134 | base |
| 138 | hole |
| 140 | screw |
| 142 | upright |
| 144 | side |
| 146 | hole |
| 148 | screw |
| 150 | void |
| 152 | brass disc |
| 154 | cover |
| 156 | hole |
| 158 | screw |
| 160 | opaque box |
| 162 | hole |
| 164 | screw |
| 166 | brass cube |
| 168 | opaque top |
| 170 | hole |
| 172 | screw |
| 174 | upright |
| 176 | clear top |
| 178 | spacing |
| 202 | hook |
| 204 | threaded shaft |
| 206 | hole |
| 207 | hole |
| 208 | nut |
| 210 | annulus |
| 211 | hole |
| 212 | bearing |
| 214 | washer |
| 216 | coupling |
| 218 | junction |
| 220 | junction |
| 221 | clamp |
| 222 | motor shaft |
| 224 | screw |
| 226 | motor |
| 227 | motor |
| 228 | block |

-continued

| DRAWINGS - Reference Numerals | |
|---|---|
| 229 | motor |
| 230 | hole |
| 232 | screw |
| 234 | support |
| 238 | hole |
| 240 | screw |
| 302 | suspension |
| 304 | frame |
| 306 | cord |
| 308 | hole |
| 310 | magnet |
| 312 | reference point |
| 312' | reference point |
| 402 | magnetic north |
| 404 | quadrant |
| 406 | quadrant |
| 408 | quadrant |
| 410 | quadrant |
| 412 | stop point |
| 414 | stop point |
| 416 | stop point |
| 418 | stop point |
| 420 | stop point |
| 422 | stop point |
| 424 | stop point |
| 426 | stop point |
| 428 | stop point |
| 430 | stop point |
| 431 | point |
| 432 | arrow |
| 502 | suspension |
| 504 | hook-and-loop fastener |
| 506 | hole |
| 508 | cord |
| 510 | frame |
| 512 | shelf |
| 514 | adhesive |
| 515 | hole |
| 516 | magnet |
| 518 | rod |
| 520 | hole |
| 522 | screw |
| 524 | spacer |
| 601 | cord |
| 602 | cord |
| 604 | suspension |
| 606 | suspension |
| 702 | suspension |
| 704 | frame |
| 706 | cord |
| 708 | hook-and-loop fastener |
| 710 | padding |
| 712 | garment |
| 802 | ring |
| 803 | hanger |
| 804 | suspension |
| 805 | knot |
| 806 | suspension |
| 807 | suspension |
| 808 | suspension |
| 809 | shelf |
| 810 | shelf |
| 811 | hole |
| 812 | threaded rod |
| 813 | hole |
| 814 | nut |
| 815 | shelf |
| 816 | suspension |
| 817 | washer |
| 818 | shelf |
| 819 | frame |
| 820 | shelf |
| 822 | extension |
| 824 | frame |
| 828 | hole |
| 830 | screw |
| 832 | adhesive |

-continued

| DRAWINGS - Reference Numerals | |
|---|---|
| 833 | hole |
| 834 | screw |
| 836 | hole |
| 838 | washer |
| 840 | nut |
| 842 | hook |
| 844 | hole |
| 846 | magnet |
| 848 | extension |
| 901 | motor assembly |
| 903 | motor assembly |
| 904 | suspension |
| 906 | frame |
| 907 | hole |
| 908 | magnet |
| 910 | suspension |
| 912 | frame |
| 914 | frame |
| 916 | frame |
| 918 | suspension |
| 922 | separation |
| 924 | separation |
| 950 | suspension |
| 952 | crystal |
| 954 | suspension |
| 956 | frame |
| 958 | connection |
| 960 | crystal |
| 962 | suspension |
| 964 | crystal |
| 1002 | ring |
| 1004 | suspension |
| 1006 | hook |
| 1007 | hole |
| 1008 | eye |
| 1009 | hole |
| 1010 | magnet |
| 1012 | frame |
| 1013 | frame |
| 1014 | top |
| 1016 | bottom |
| 1018 | side |
| 1020 | nut |
| 1022 | washer |
| 1202 | suspension |
| 1204 | frame |
| 1206 | cord |
| 1208 | suspension |
| 1210 | frame |
| 1212 | cord |

DETAILED DESCRIPTION

The preferred embodiment is shown on FIG. 1A. But before describing FIG. 1A, there are some common aspects of these Displays that need to be addressed. By addressing the common aspects first the reader will gain insight about this invention.

Magnets

Magnets are required for reverse-rotation motion. Ordinary magnets—like ceramic and hard ferrite magnets—will not produce the desired results (see below). They need to be rare earth magnets. They are available from:

Adams Magnetic Products

Dowling Magnets

Magnet Sales and Manufacturing Inc.

Other suppliers

Caution: The rare earth magnets must be handled with considerable care. When the magnets are brought close together they nearly always surprise the person holding them. They can come together with such a force that the magnets can be damaged.

These Displays produce reverse-rotation motion because of forces that result from an interaction of the Earth's magnetic field, and rare earth magnets. Without these strong magnets, there would be little reverse-rotation. Ordinary magnets do not give persuasive evidence of the presence of the Earth's magnetic field. Models using rare earth magnets can give students excellent exposure to important areas of the physical sciences. In addition, they can learn about the methods of science by using a multi-step elimination approach described later. The magnets used in the models tested were purchased from Dowling Magnets. Here is a list of magnets along with Dowling Magnets part numbers:

| FIG. | Reference Numeral | quantity | part number |
|------|-------------------|----------|-------------|
| 1A   | 106               | 4        | NE153N      |
| 1E   | 106               | 4        | NE153N      |
| 3    | 310               | 2        | NE231N      |
| 5    | 516               | 2        | NE058A      |
| 6    | 516               | 6        | NE058A      |
| 7    | 516               | 2        | NE058A      |
| 8A   | 516               | 2        | NE058A      |
| 8B   | 516               | 2        | NE058A      |
| 8B   | 846               | 2        | NE006       |
| 9A   | 908               | 32       | NE143N      |
| 9B   | 908               | 2        | NE143N      |
| 10   | 1010              | 4        | NE058B      |
| 11   | 106               | 4        | NE153N      |
| 12   | 106               | 8        | NE153N      |

A quote from Dowling Magnets catalog states:

"Rare earth magnets are used when high strength, low mass and size are the main concerns. Neodymium is the strongest magnet material commercially available. Standard grades retain full strength up to 80° C. (176° F.). Samarium cobalt magnets, although not as strong as neodymium, function at much higher temperatures—up to 300° C. (572° F.)."

In general, all motion associated with this invention comes from two very different sources. In all cases, the forward motion comes from the mechanical rotation of a motor shaft. All reverse-rotation motion is a direct result of magnetic forces that are due to the Earth's magnetic field. The invention utilizes these two sources to produce Displays that have very different characteristics.

By way of reference, the location of the Earth's magnetic poles can be found in, "McGraw-Hill Concise Encyclopedia of Science & Technology" under, "Geomagnetism" where it is stated, "there are two magnetic poles; their approximate positions are 76.1° N, 100° W and 65.8° S, 139° E."

The New Encyclopedia Britannica states, "the total geomagnetic force at the geographical Equator and near the poles of the Earth amounts to approximately 0.3 and 0.7 gauss, respectively." The Britannica defines gauss as, "the unit of magnetic induction in the centimeter-gram-second system of physical units." The dictionary defines "magnetic induction" as, "a vector quantity that is used as a quantitative measure of a magnetic field." "Vector" is defined as, "a quantity that has magnitude and direction and that is commonly represented by a direct line segment whose length represents the magnitude and whose orientation in space represents the direction."

Motors

In general, each Display requires a motor; there is one Display that requires 3 motors. All the test results involved motors that are often used for timing and control purposes. They are also used in heating and air conditioning systems to open and close valves. Motor speeds starting at $\frac{1}{168}$ revolutions per hour (one revolution per week) up to 120 revolutions per minute (rpm) are available.

They are sold as low speed motors but they are really motor/gear train combinations. The motor part operates, typically, at 600 rpm. And the gear train, which is an integral part of the motor, provides the required output speed. Including the gear train, the motors used were 2" in diameter and 1½" in height.

Such motors are referred to as hysteresis motors because of how their internal magnetic field is coupled from the coil assembly to the rotor/shaft assembly. (Webster's New Collegiate Dictionary defines "hysteresis" as, "a lagging in the values of resulting magnetization in a magnetic material due to a changing magnetic force.") These motors have the outstanding feature of being able to stall indefinitely with no damage to the motor.

The motors operated on 120 volts AC. They came from:
Surplus Center, Lincoln, Nebr.
Hansen Corp., Princeton, Ind.

Their one special characteristic was the ability to operate at low speed. Very little torque was needed for motors to meet the requirements of the test models. In Webster's New Collegiate Dictionary "torque" is defined as, "a force that produces or tends to produce rotation or torsion—an automobile engine delivers torque to a drive shaft." And "torsion" is defined as, "the twisting or wrenching of a body by the exertion of forces tending to turn one end or part about a longitudinal axis while the other is held fast or turned in the opposite direction." Motor torque ratings of less than 50 ounce-inches were used for the test models that follow.

Motors that use voltages other than 120 volts AC can be used. Motors that use direct current will work fine, but appropriate voltages are needed.

Solar cells can be used to provide the electrical power for the motors.

Variable Speed Motion

There are two primary features that characterize the dynamic behavior of these Displays. First is the reverse-rotation motion, and second is the variable speed. Variable speed is a consequence of the periodic stopping and starting of a Display. This feature causes the eye to notice, with curiosity, the motion involved.

Notes that apply to construction of Displays

General note #1: Magnets are placed in recessed holes in a frame by:
 1) a snug fit between the magnet and the hole, or
 2) tape wound over the magnet and around the frame, or
 3) a small amount of adhesive placed in the hole before the magnet is inserted.

General note #2: "S" hooks. Several different size "S" hooks are used for constructing the figures. They are a convenient way to assemble and disassemble Displays—specially while tests are being performed.

General note #3: Brass hardware. The construction of frames for FIG. 5, FIG. 6, FIG. 8A, and FIG. 8B requires brass screws, nuts, washers, and threaded rods. Nonmagnetic materials prevent distortion of magnetic fields of the magnets.

DESCRIPTION OF THE PREFERRED EMBODIMENT

FIG. 1A shows the preferred embodiment of this invention. It consists of three parts.

Figure 1B:
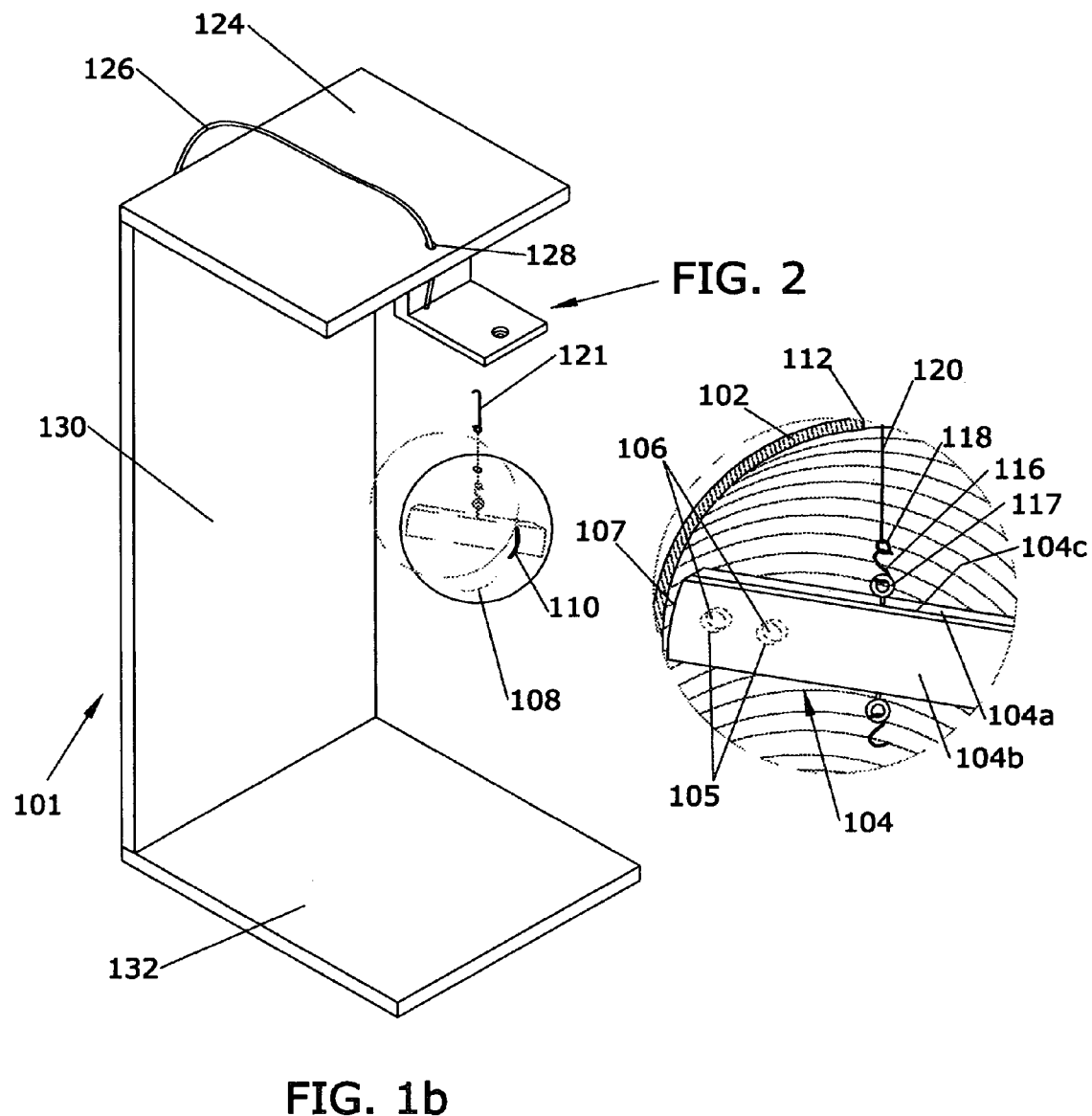
FIG. 1E is a perspective view of FIG. 1b with a second ball added to the portable stand.
Figure 1C:
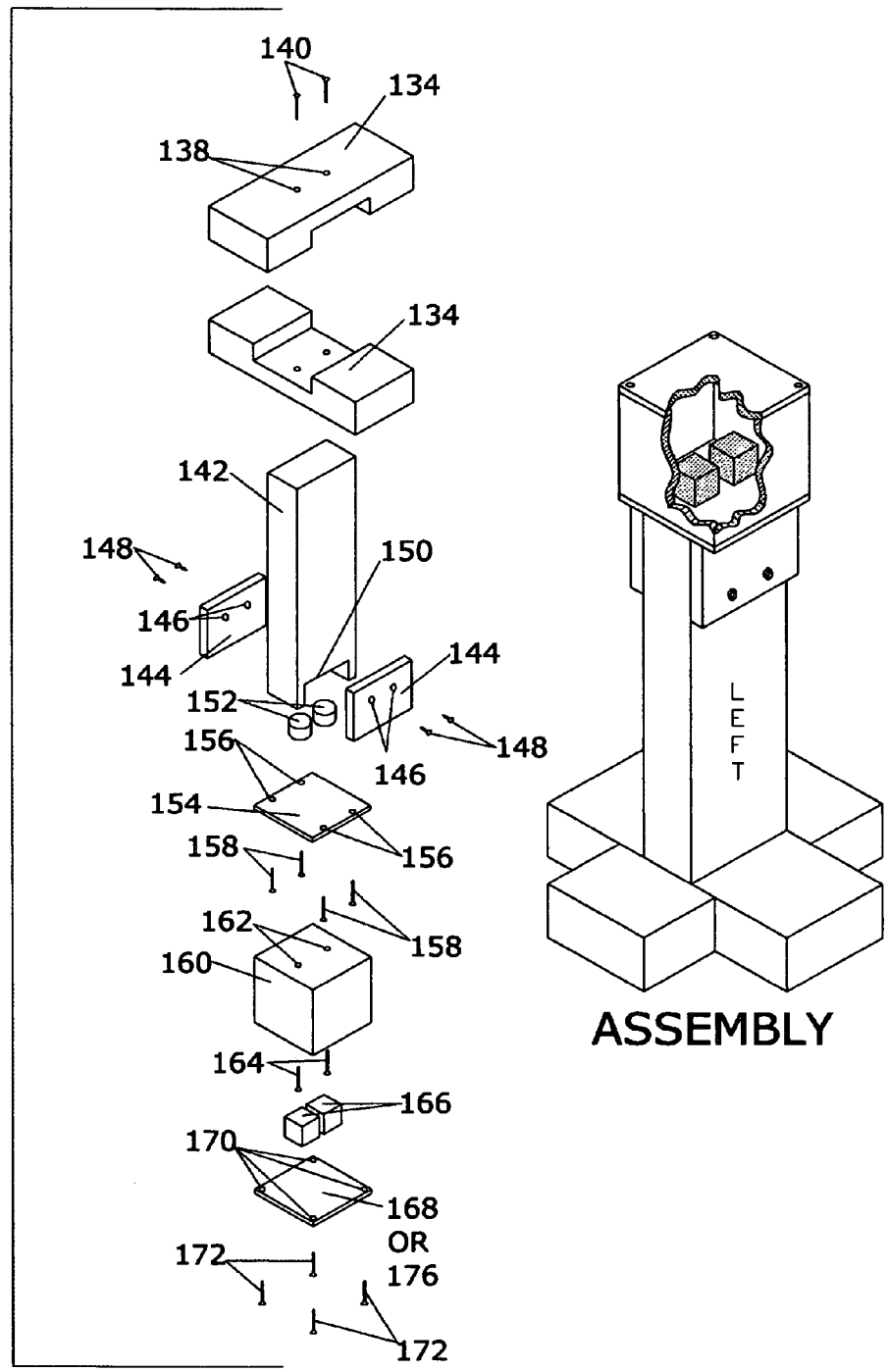

FIG. 1b—ball 102 suspended in portable stand 101,

FIG. 1c—the left side stand, and

Figure 1D:
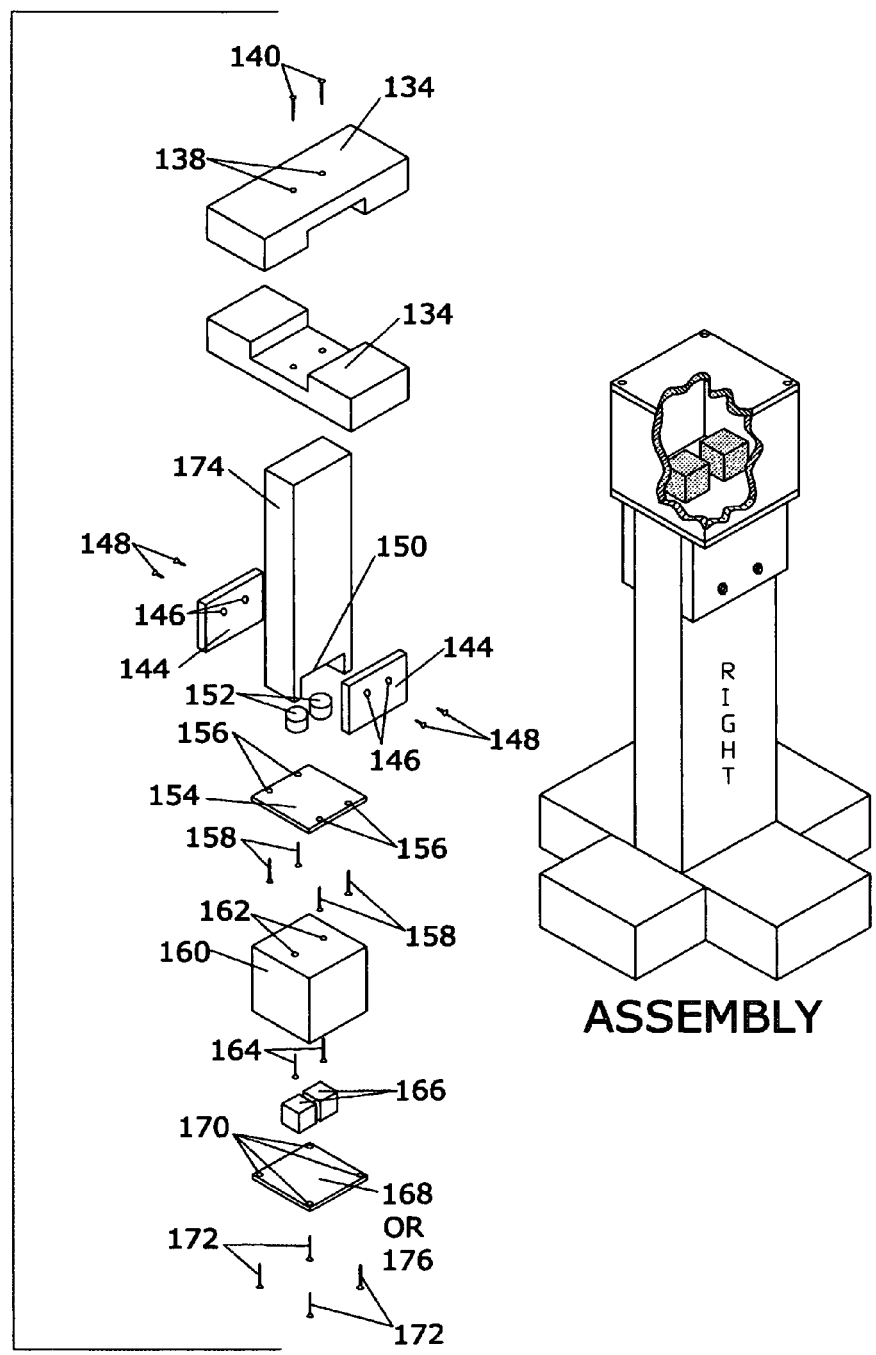

FIG. 1d—the right side stand.

The purpose of the preferred embodiment is to help students learn important concepts about science.

Whenever "ball 102" is mentioned, it should be read as "basketball 102". There are many references to ball 102; and using that shortened form saves time and space. The same comment applies to ball 109 that comes later. A basketball was chosen because:

1) its size is appropriate for a science class of 30 or 40 students.
2) it provides students with a familiar starting point. Many will show approval before the science starts: that should prove helpful.
3) test models show that a basketball works well. And, it provides a way to conceal the magnets that cause the unexpected motion.

Depending on the size of a class, and the interest of the students, ball 102 could be a soccer ball, football, etc. For special circumstances, the preferred embodiment can be scaled larger. Based on test results, balls larger than four feet in diameter can be used. (Scaling smaller is also possible. It's very likely a golf ball could be made to reverse-rotate.)

Some principles of FIG. 1A are easily learned; some are not. Experienced science teachers can decide how much class time is needed to explain the principles that govern the observed motion. One important lesson for students, particularly in the early years, is to learn that science is, to a large extent, detective work. Understanding the methods of the television detective Lt. Colombo can help students acquire scientific knowledge. Some of the parts in FIG. 1A are included to allow students to make careful observations. A "sequence of steps" on page 40 gives students a chance to individually, and in discussions with others, put into words what they are seeing when they watch the motion of FIG. 1A. As the weeks go by, they will see that what they thought was causing the odd behavior of the ball of FIG. 1A, is, very likely, incorrect. Hopefully, in time they will become astute observers.

The preferred embodiment involves equipment that can convey important basic concepts. Through actual observations students will be challenged to learn how to make rational decisions in working with experimental equipment. One objective is to help students understand how, seemingly, relevant equipment components can cause incorrect conclusions. Such understanding comes from knowing the theory involved, and in learning how to interpret laboratory results. To be successful in arriving at the correct conclusions students need teachers who can effectively guide them.

All things considered, it seems that the Display in FIG. 1A is better suited for science students starting with the 11th grade. It's likely that students below that grade will, generally, be unable to grasp the concepts involved. High school exposure should be viewed as an introduction to the mechanisms involved.

FIG. 1b—Center Portion of Preferred Embodiment

The assembly of FIG. 1b starts with constructing portable stand 101. Here are the dimensions for the pieces:

| top 124 | 14" wide | 12" deep |
|---|---|---|
| back 130 | 14" wide | 32" high |
| bottom 132 | 14" wide | 16" deep |

Three-quarter inch plywood is recommended. Place bottom 132 on a flat surface, attach back 130 to bottom 132 using 2" wood screws. Then attach top 124 to back 130 using similar screws. Now drill hole 128 in top 124 large enough for electrical power cord 126 to fit through. Cord 126 will provide 120 volts AC to motor 226. Later, motors 227 and 229, from FIG. 9A, will use the same voltage. The completion of stand 101 must wait until the FIG. 2 motor assembly is assembled.

We turn now to the assembly of frame 104. It should be made of wood, or other lightweight nonmagnetic material. When complete, frame 104 measures: ¾" thick, 1¼" high, and 9¼" long. It is made up of base 104a, and cover 104b. Adhesive 104c holds the two together. Drill four holes 105 in base 104a: outside holes should be ½" from each end of frame; inside holes should be 2" from each end; all holes should be centered in the 1¼" height. Holes 105 need to be ½" in diameter and ⅜" deep. Put magnets 106 in holes 105. It is critical that all four magnets 106 are placed in the frame so their north-seeking poles are on the same side of frame 104. Put adhesive 104c on the part of base 104a that will get bonded to cover 104b. Use several clamps to hold frame 104 together. After the adhesive has cured, remove a small amount of wood from each end of frame 104 so ends 107 match the interior surface of ball 102 as shown in FIG. 1b. Its important that frame 104 be a little longer than the inside diameter of ball 102. That will cause a small pressure between frame 104 and ball 102 to keep the frame in place. Later, it will be possible to remove, and replace, frame 104 in ball 102 so students can conduct additional tests using frames with different characteristics.

To place frame 104 in ball 102 proceed as follows. Screw eye 117 in either narrow surface of frame 104 at midpoint. Place one end of hook 116 in eye 117. Using pliers, close hook 116 in eye 117. In preparation for FIG. 1E repeat for eye 117 and hook 116 on the other narrow surface. Tie end rings 118 on suspension 120. Place one ring 118 over either hook 116. Using pliers, close hook 116 on ring 118. Suspension 120 and frame 104 should now be tied together permanently.

Put the above combination aside until the first three steps of the following sequence have taken place. Then, frame 104 will be put inside ball 102.

1) Deflate ball 102.
2) Cut round hole 112 at the top of the ball. The hole should be ½" in diameter.
3) Cut incision 108 along the bottom of ball 102. It should be along a seam. The incision should be no longer than 5 inches. A longer incision affects the spherical shape of the lower portion of the ball.
4) Put the free ring 118 of suspension 120 that is attached to frame 104 through incision 108. Put the ring through hole 112 from the inside.
5) The next step is best done by a person who has small hands and strong fingers. Put frame 104 through incision 108. Using patience, move the frame to the position shown in FIG. 1b. Pull ring 118 until slack has been eliminated from suspension 120.

6) Now, frame 104 should be properly positioned inside ball 102. A slight pressure from ball 102 on ends 107, of frame 104, will keep it in place.

7) Put ball 102 aside until stand 101 has been completed. Stand 101 has already been constructed, but it needs one part: The motor assembly depicted on FIG. 2.

Figure 2:
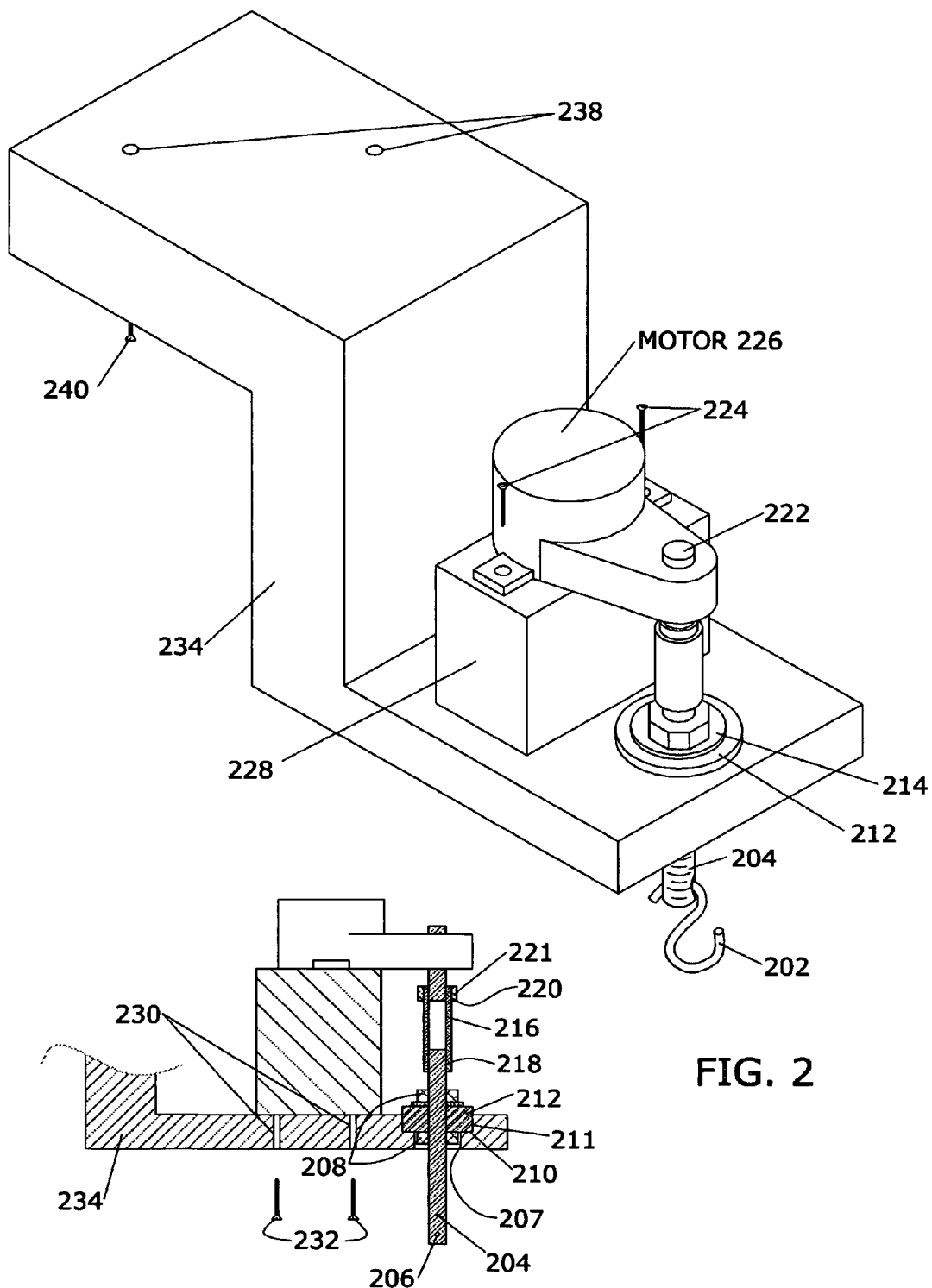
FIG. 2 is a perspective view of a motor assembly.

FIG. 2—Motor Assembly

Without exception, all motion associated with these Displays starts with the rotation of the vertical shaft of FIG. 2. Before presenting the detailed description, this section provides an explanation of why the design of FIG. 2 is a part of this application. The early testing of Displays involved models that weighed less than 5 ounces. These lightweight models could be hung directly from a motor shaft without damage to the motor. However, later models weighed up to 5 pounds. Such loads could not be hung from the low speed motors that were used for these Displays. So a search was begun to locate motors that could support a vertical load of 5 pounds. The Yellow Pages, and the Internet, were used to find possible suppliers. About 15 requests were made for motors that could meet the following requirements:

speed about 1 rpm
vertical output shaft
support a 5 pound hanging load
cost less than $200

No supplier was found. The main difficulty was with the 5 pound hanging load.

FIG. 2, which evolved from the need for rotating these Displays, meets all the above requirements. More than 10 models of FIG. 2 have been constructed and used. Several have been used to support 5 pound loads; one has been in use over 1000 hours. Using surplus motors (that seem to be in new condition) the total cost for materials was about $12 for each motor assembly. (Surplus motors cost less than $2; new ones cost about $22.)

FIG. 2 can be mounted in stand 101 of FIG. 1*b*, or under most any horizontal surface such as a ceiling of a room.

Here is a summary of what FIG. 2 does:
provides rotational power
supports weight
transfers weight to a mounting surface
protects the motor by eliminating all vertical pull from the motor shaft.

FIG. 2—Construction of the Motor Assembly

To construct FIG. 2 cut a 2" long piece of metal threaded rod that is ¼" in diameter and has 20 threads per inch (¼"-20). That will be threaded shaft 204. Drill an ⅛" hole through the diameter of the shaft, ¼" from one end. That will be hole 206. Put nut 208 (¼"-20) on shaft 204 about 1" from hole 206. Put bearing 212 over the end of shaft 204 that does not have hole 206. Bearing should set on nut 208. Now put washer 214 and another nut 208, on shaft 204, on top of bearing 212. Do not tighten nuts 208. Put the end of shaft 204 that has hole 206 through hole 211 and through hole 207. Holes 211 and 207 have been cut in wood support 234. Bearing 212 should set in hole 211 with its bottom setting on annulus 210. Bearing 212 is a ball bearing 1" in diameter with a ⅜" hole and its width is ⅓".

The next step joins shaft 204 and coupling 216. Coupling 216 is PVC clear flexible tube that measures 1" long; it has ⁵⁄₁₆" outside diameter; and ³⁄₁₆" inside diameter. Hold the end of shaft 204 that has hole 206, and put the other end against one end of coupling 216. By holding coupling 216 in place, turn shaft 204 clockwise and cut four threads inside coupling 216 to form junction 218. The other end of coupling 216 fits over motor shaft 222 to form junction 220. About ¼" of coupling 216 should fit over shaft 222. Circular hose clamp 221 will be tightened to make junction 220 permanent after the in-line parts have been properly positioned.

There are two parts made of wood on FIG. 2: block 228 and support 234. Attach block 228 to support 234 using screws 232 in holes 230. Put hook 202 in hole 206.

At this time, several matters need to be discussed. Motor 226 is not designed for in-line, and lateral (side) forces to its shaft. Such forces greatly shorten motor life. These comments also apply to motors 227 and 229 that are used in FIG. 9A. Motor 226 will be protected by following these procedures. The primary concern when operating a Display is that all weight hung from hook 202 must be transferred to top 124 of stand 101 in FIG. 1*b*. For that to happen, hook 202 pulls on shaft 204, which pulls on bearing 212, which pulls on annulus 210, which transfers the weight, by way of support 234, to top 124.

Caution:
1) Weight hung from hook 202 must not pull on motor shaft 222.
2) Motor 226 must be mounted so proper alignment of shaft 222 and shaft 204 exists.
3) Coupling 216 must be installed so no tension, or compression, is felt by shaft 222.

Point 3 above is not difficult, but it does require careful attention to how the two nuts 208 are tightened. Its fortunate that shaft 222 is exposed above motor 226 by a small amount—see FIG. 2. (The exposure allows a person to observe a small amount of end play of shaft 222. This can be used, while tightening nuts 208, so a neutral force exists in coupling 216, after nuts 208 are tight.) Notice that bearing 212 does not get fastened to support 234. This fact can be used to determine if nuts 208 are in the correct position. See below.

With junction 220 in place, but clamp 221 not tight, put motor 226 on block 228, but do not use screws 224 to secure the motor. While holding motor 226 against block 228, find the place that gives the best alignment of shaft 222, coupling 216, and shaft 204. This may require some repositioning of motor 226. Looking at the parts from angles separated by 90° works well. When the shafts are aligned, attach motor 226 to block 228 using screws 224. Tighten clamp 221. This completes the assembly of FIG. 2. However, one final test must be made. Hold the motor assembly in one hand and push on shaft 204 with the other hand near where hook 202 is located. Look carefully for evidence of small end play of shaft 222 on the top of motor 226. If no end play is seen, reposition the two nuts 208 that hold bearing 212 to shaft 204.

Now attach FIG. 2 to top 124 of stand 101 using screws 240 in holes 238. Support 234 can be mounted to other horizontal surfaces. This completes FIG. 2.

There are several special features of FIG. 2 that make the motor assembly functional and inexpensive. Annulus 210 provides the resting area of the outside ring of bearing 212. The annulus serves to transfer whatever weight is hung from shaft 204, to a firm mounting structure. The cost to construct annulus 210 is almost zero; it comes from a difference in the diameters of holes 211 and 207 in wood support 234. Another feature involves coupling 216. The requirements of the coupling are simple: transfer power from a motor shaft to an in-line second shaft taking into account cost, size, and complexity. Many kinds of couplings are available that allow for slight misalignment of two in-line shafts. Over a period of weeks, about 10 companies were contacted. No supplier was found. After that, work was begun to make a coupling. Various materials and techniques were tried. The results of the work lead to coupling 216, and in a larger sense, the entire FIG. 2 motor assembly. All the requirements for the coupling are met by using a one-inch length of PVC clear flexible tubing and one hose clamp. The clear tubing cost a few pennies.

Before leaving FIG. 2, there are three relevant points:
1) Displays over 5 pounds require a redesign of support 234. The redesign would permit a modified support 234 to be attached on two opposite sides of the motor assembly.
2) Suitable motors are required for heavy frames.
3) The use of low speed motors designed to carry vertical loads can greatly simplify FIG. 2.

FIG. 1*b*—Final Assembly

Now we return to the assembly of FIG. 1*b*. Put hanger 121 on hook 202. Hook 202 is the lowest part of FIG. 2. Its located near the top of stand 101. Then, put ring 118 on hanger 121. (The length of hanger 121 should be chosen so ball 102 is centered in stand 101.) Ball 102 is now hanging in stand 101 ready for operation. Line 110 is a reference line for keeping track of ball rotations. This completes assembly of FIG. 1*b*. (Later, starting on page 50, the reader will see the results of a comprehensive evaluation of one critical part of FIG. 1*b*. The evaluation involved carefully observing the motion of ball 102 as suspension 120 was changed. Ten different suspensions were tested. The particulars are explained and summarized in the text that starts on page 50.)

FIG. 1A—Side Stands FIG. 1*c* and FIG. 1*d*

Now, the side stands from FIG. 1A will be discussed. These stands are part of the preferred embodiment for a special reason. They are included, specifically, to aid students in understanding how science is learned and understood. That includes realizing a student can benefit by thinking like Lt. Colombo. The "sequence of steps" on page 40 will guide students through the process of finding the reason why ball 102 sometimes reverses direction—it should make a lasting impression. Students will see at the start that motor 226 goes only in one direction. When students observe the unexpected motion of ball 102 in FIG. 1A, they will, likely, conclude side stands FIG. 1*c*, and FIG. 1*d* contribute the mysterious force that causes the reverse-rotation motion. So, step-by-step, the side stands are systematically examined to learn how they relate to ball 102. FIG. 1A shows each side stand is separated from the surface of ball 102. Initially, the spacing is set at 12 inches. The center of ball 102 and the center of boxes 160 all lie in a straight line.

After observing and following the sequence (that comes later), the students realize there is a big problem. When all the steps of the sequence have been followed, the side stands (with their hidden cubes and discs of brass inside) are actually removed from the test area, ball 102 still moves the way it did from the start. This means that the side stands FIG. 1*c*, and FIG. 1*d*, had nothing at all to do with the reverse-rotation motion of ball 102. Well, the next thing is to eliminate any influence that might come from the classroom environment. So, on a day when there are no breezes, the teacher can take the class outside the school building. An electrical extension cord can provide power to FIG. 2 in portable stand 101. Students can then watch the motion of ball 102 in an open area that could be 100 feet from the nearest man-made structure. Here is the whole test setup: a small wooden table; ball 102 suspended in stand 101; and the electrical extension cord. There are no other metal objects, other than what is in the students' and the teacher's pockets, within 100 feet. After the power is turned on, ball 102 is allowed about five minutes to settle into its normal rhythm. Everyone soon realizes that ball 102 still goes in the reverse direction—just like it did from the start. So, the mystery continues.

Up to this point, the students should not be aware of what is inside ball 102. But even if they were, it might not help in answering the key question. That's because there isn't much inside to give any clues. Especially, if frame 104 has been made carefully, so it looks like an ordinary piece of wood. There is bound to be a general feeling of confusion. Considering all that happened while observing and studying ball 102, the students are now at a propitious time for "real learning." They are now open to an explanation of what the source of the mysterious force is. And the very best thing that could happen is a well prepared, and motivated, teacher would lead them to some scientific insights that may stay with them for a lifetime. Its not too much to hope that some in the class will, based on this lengthy exercise, decide to follow a career in engineering, physics, Earth science, etc. Some students may learn more of the ways of science, and the ways of Lt. Colombo, and become valuable law enforcement officers.

Assembly of Side Stands FIG. 1*c* and FIG. 1*d*.

There are several matters that need attention before beginning assembly of the side stands. The following list identifies some of the needed parts.

| Numeral | total required | dimensions(in) | material | comment |
|---|---|---|---|---|
| box 160 | 4 | 4 × 4 × 4 | wood | 1 for each side stand<br>1 for each student inspection box |
| opaque top 168 | 2 | 4 × 4 × ½ | wood | 1 for each side stand |
| clear top 176 | 2 | 4 × 4 × ¼ | plastic | 1 for each student inspection box |
| brass cube 166 | 8 | 1 × 1 × 1 | brass | 2 for each side stand<br>2 for each student inspection box |
| brass disc 152 | 8 | 1 diameter, ½ thick | brass | 2 for each side stand<br>2 for each student inspection box |

There are two student inspection boxes included in the above list. They will be used in the "sequence of steps" on page 40. Those steps are designed to give students a solid appreciation for the science involved. Later, at the appropriate time, the two boxes containing brass cubes 166 and brass discs 152, and covered with clear top 176, will be circulated among the students so they can hold in their hands part of the preferred embodiment, FIG. 1A. It would, indeed, be interesting to know what students think as they hold box 160 and consider the motion of ball 102.

Assembly of Side Stands FIG. 1*c* and FIG. 1*d* Continued

Base 134 is joined to a second base 134, then upright 142 is attached by putting screws 140 into holes 138. These pieces can be made of 2"×4" lumber. Both sides 144 are attached to upright 142 using screws 148 in holes 146 making sure the tops of sides 144 are even with the top of upright 142. Place 2 brass discs 152 in void 150. Put cover 154 on top of upright 142 and sides 144 making sure cover 154 is centered on the lower portion. Using screws 158 in holes 156, screw cover to sides 144. Next attach opaque box 160 to cover 154 using screws 164 in holes 162. Place 2 brass cubes 166 in box 160. Opaque top 168 is fixed to box 160 using screws 172 in holes 170. That completes assembly of FIG. 1*c*.

The only difference in assembling FIG. 1d is to repeat the above sequence, but put upright 174 in place of upright 142. (The word "Left" is painted on the front vertical surface of upright 142. The letters go from the top down. Similarly, upright 174 has the word "Right".)

All the main parts of FIG. 1A have now been assembled. However, there are still several steps that need attention. The stands FIG. 1c and FIG. 1d are to be positioned so students can see the "Left" and "Right" surfaces. Additionally, stands FIG. 1c and FIG. 1d are to be placed so an imaginary center line, through ball 102, will pass through the center of box 160 on the left, and box 160 on the right. Spacing 178 is measured from the center of ball 102 to the center of each box 160. Initially, spacing 178 should be 20 inches. These spacings can be easily changed by the teacher after the initial testing has been completed.

FIG. 1E—A Second Ball Added to FIG. 1b

At this time, follow the above procedure to assemble the only missing part of FIG. 1E: upper ball 109. Note that frame 111 has the same outside dimensions as frame 104. But it's much simpler: its made of one piece of wood, and it has no magnets. Note also that ball 102 has round hole 112 at the top; ball 109 has square hole 113 at the top. Hole 112 should be ½" in diameter. Hole 113 should be ½"×½". These holes will be used to identify the two balls that otherwise may be identical.

Review of several points regarding frames 104 and 111. Both frames have hooks 116 permanently attached to eyes 117—there are four hooks 116. One ring 118 of each suspension 120 is permanently attached to one hook 116 of frames 104 and 111. The top ring 118 of each suspension 120 does not get permanently fastened to any hook.

FIG. 1E came about while testing models of the preferred embodiment, FIG. 1A. Its an excellent model for students to continue learning how the Earth's magnetic field can be used to understand magnetic forces and rotational motion. One significant advantage of the design of FIG. 1b is that a second ball can easily be hung from ball 102. That's done by putting suspension 120 of the bottom ball through incision 108 of top ball 102. See FIG. 1E. The same dimensions are used to construct portable stand 101 for FIG. 1b and FIG. 1E. However, hanger 121 is not used with FIG. 1E.

Special Note: Based on construction of five frames like frame 104, and another five frames like frame 111, its possible to make them look identical without using paint. This is done by selecting the wood carefully and sanding carefully after the adhesive has cured. This is important because it will add to the intrigue that students face while observing the dissimilar behavior of balls 102 and 109. It is expected that in time frames 104 and 111 will be placed side-by-side for a thorough examination. Its highly desirable that the two frames look exactly alike.

If ball 109 is placed in stand 101, and power is applied, ball 109 will never go in the reverse direction. However, if ball 109 is removed, and ball 102 is placed in stand 101, ball 102 will frequently reverse direction. So, if the balls look alike, and the frames look alike, and the same suspension 120 is used, and there is only one stand 101 for both balls, there is considerable uncertainty. Its likely, the time will come when some students will realize that ball 102 has a round hole at its top, and ball 109 has a square hole. And since there are no other recognizable differences, there may be something about the shape of holes 112 and 113 that's responsible for the anomalous behavior of ball 102. That's part of the intrigue. Some excellent science insights are very near for the students.

More information regarding FIG. 1E appears on page 43.

Figure 3:
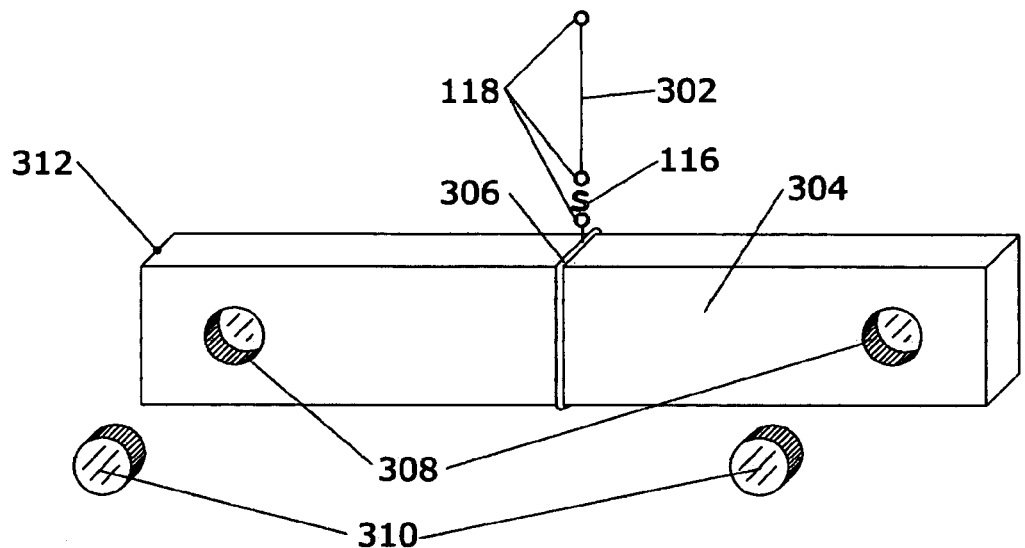
FIG. 3 is a perspective view of a suspended frame that rotates.

FIG. 3—The basic Display

FIG. 3 shows frame 304 (made of wood) and the parts necessary to make it rotate. Hook 116 fits in ring 118 that is part of cord 306. (See General note #2 on page 15.) A cord is used around a frame so the frame can be easily balanced. Several figures use this approach. Ring 118 of suspension 302 fits over hook 116. Suspension 302 is attached to FIG. 2 by way of top ring 118. Rotational power is provided by FIG. 2. Magnets 310 are seated in holes 308. (See General note #1 on page 14.) On the top left end of frame 304 is reference point 312. The distance from the center of frame 304 to reference point 312 is the radius of any circle made by rotation of frame 304.

Figure 4:
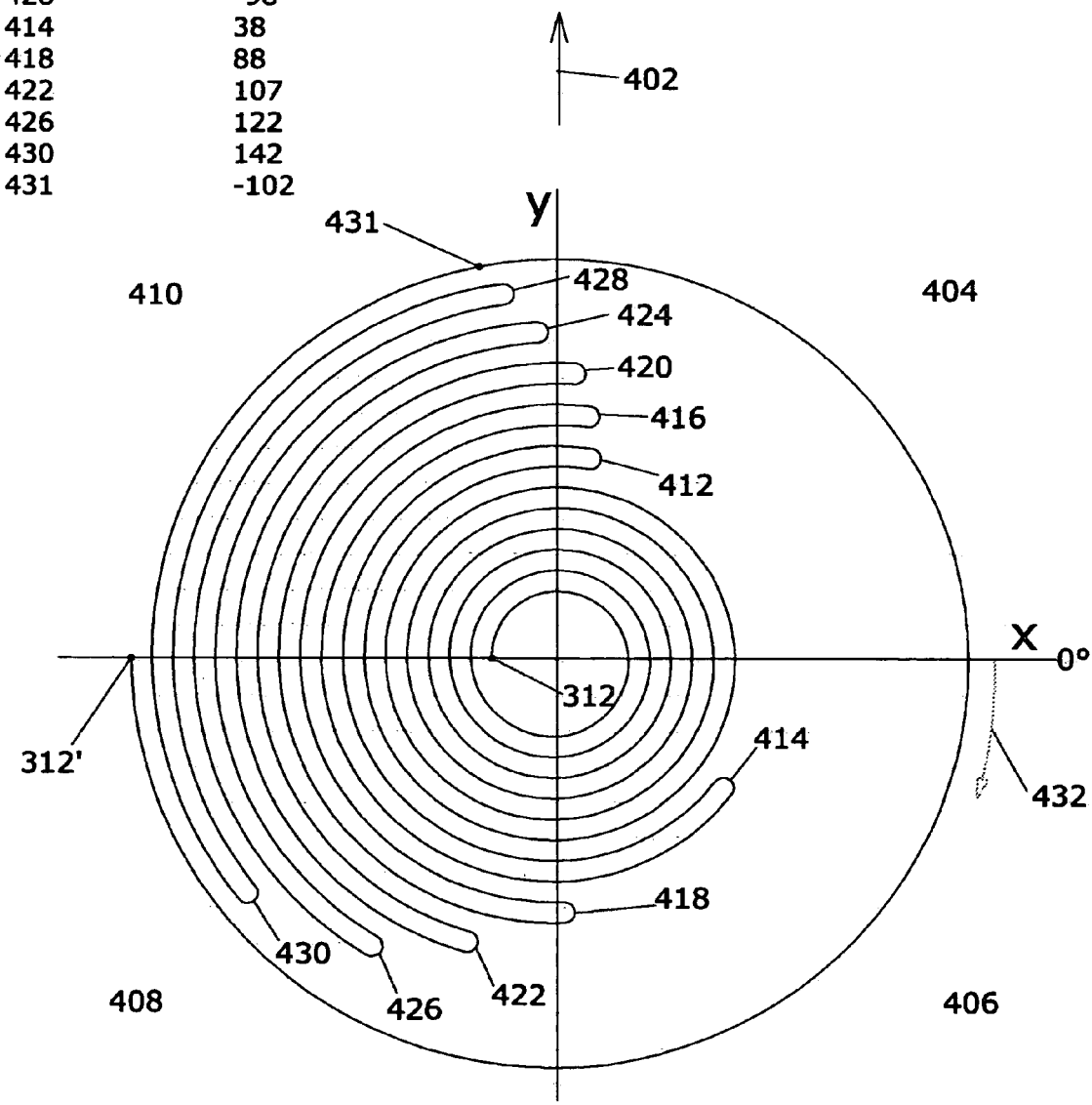
FIG. 4 is a graph view of a full cycle of motion of the FIG. 3 frame.
Figure 11:
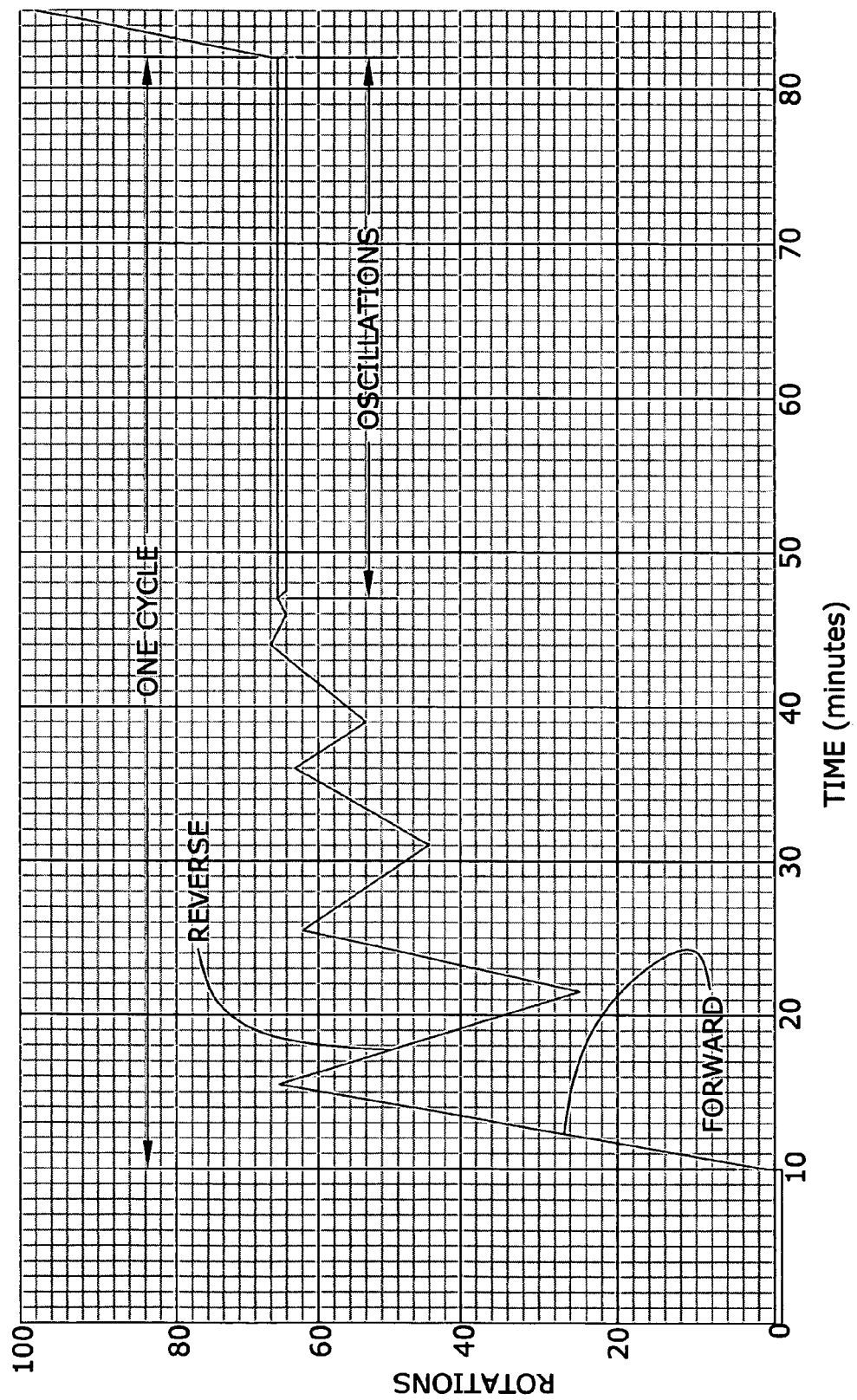
FIG. 11 is a graph view of a summary of ball rotation vs. time.

The terms "cycle" and "full cycle" are equivalent. Definition: A cycle is that period of time which includes, 1) the time needed to complete multiple forward rotations of a frame, plus, 2) the time needed to complete multiple oscillations (reverse and forward) of a frame. FIG. 4 and FIG. 11 show, in detail, graphs of cycles that came from tests measurements.

FIG. 4—Graph of the Motion of FIG. 3

FIG. 4 shows one full cycle of frame 304. Reference point 312 is the radius of any circle made by rotation of frame 304. As seen from above, a permanent record of point 312 will show a circle after frame 304 has rotated 360°. Subsequent rotations, whether partial or full, will be hidden by the first circle. This presents a problem, since such a record is not helpful toward understanding the complex motion of frame 304. Therefore, to overcome this difficulty, successive rotations were separated, on paper, by allowing the radius of point 312 to increase with time. That's how the spiral of FIG. 4 was drawn.

The starting point for the graph of FIG. 4 is reference point 312. Its the closest point to, x=0, y=0. After 17 crossings of the negative x-axis, the cycle ends at reference point 312'. Both full and partial rotations are involved. Note: point 312 and point 312' are the very same point. The particular advantage gained by allowing the radius to increase with time is readily apparent from FIG. 4: all motion is presented for the full cycle of frame 304.

FIG. 4 is a record of time and angle measurements made while testing frame 304. Angles were recorded from above rotating frame 304—using a 360° scale. The parameters used to obtain these results will be included at the end of this section. At the top of FIG. 4 is magnetic north 402. Four quadrants are shown as: quadrants 404; 406; 408; and, 410. Arrow 432 indicates the forward direction of motion was clockwise.

The actual sequence that was used to graph FIG. 4 was:
1) Point 312 was completing one cycle, and starting a new one. As point 312 crossed the negative x-axis, a stopwatch was started. That time was represented by t=0 seconds.
2) Point 312 rotated forward for a little more than 6¼ rotations (See FIG. 4).
3) Point 312 stopped at stop point 412. It then rested for several seconds. After that, it moved in the reverse direction to point 414. It rested for several seconds.
4) Point 312 followed the pattern just mentioned until it had moved beyond points, 416, 418, 420, 422, 424, 426, 428, and 430.
5) After reversing directions at point 430, it moved toward point 431. Based on the previous five stops (points 412, 416, 420, 424, and 428), point 431 could have been another stop point. But it wasn't. So, that indicated with 100% certainty that the next crossing of point 312 of the negative x-axis, would be the end of the cycle. That point would be reference point 312'.

Here are the actual times that were recorded for the rotation of frame 304.

|  | time | |
| --- | --- | --- |
| sequence | minutes | seconds |
| start | 0 | 0 |
| end of about 6¼ rotations | 2 | 19 |
| last stop, point 430 | 6 | 48 |
| end, point 312' | 8 | 10 |

Point 431 was mentioned above as being a possible stopping point for frame 304. Actually, point 431 was the very last thing added to the graph of FIG. 4. It was a guess, based on a trend. We shall see more on this shortly.

The test data for drawing FIG. 4 were recorded after frame 304 had completed several continuous cycles. After that, three more cycles were observed. Here is a short comparison of four of the cycles.

| cycle | cycle time | number of oscillations |
| --- | --- | --- |
| test (FIG. 4) | 8 min 10 sec (above) | 10 (FIG. 4) |
| test +1 | about 10 min | 12 |
| test +2 | about 10 min | 12 |
| test +3 | about 8 min | 10 |

Several things can be said regarding these cycles: 1) test+1, and test+2, would both have had a reversal of direction, of frame 304, at a point like 431 (assuming graphs like FIG. 4 had been prepared.) 2) The cycle time and number of oscillations are quite close for the first and last tests. And the second and third tests are quite close. It has been observed, while running dozens of Displays, that some repeat with a difference of less than 10%; others differ by more than 20%.

One more general observation relates to the quadrants that a frame normally stops in, after completing multiple forward rotations. The quadrants are 404 and 406 on FIG. 4. That's believed to be the result of the direction the motor turns. The forces responsible for the forward motion of a frame, add, and subtract, in ways that all but rules out—except in unusual circumstances—stopping in quadrants 408 and 410. It is believed that the opposite situation will exist if the direction the motor turns is reversed.

There is another consideration that relates to the measured data taken on frame 304. It involves the 6 full rotations on FIG. 4 that start at point 312. Each of those rotations was timed. The fastest speed of frame 304 occurred during rotations 3 and 4. The speed was the same for both: 4.3 rpm. The motor speed was 0.8 rpm. This means that a ratio of 5.3:1 existed between the frame speed and the motor speed.

Special note: With this anomaly in mind, its no exaggeration to say that this is the secret to why these rotating frames routinely reverse direction.

As stated earlier, here are the values of the parameters used in FIG. 3.

| motor speed: | 0.8 rpm |
| --- | --- |
| motor rotation: | clockwise (from above) |
| frame (wood): | |
| length | 18" |
| height | 1.25" |
| thickness | 0.4" |
| suspension (mercerized cotton covered polyester thread): | |
| length | 0.35" |
| magnets (2): | |
| diameter | 0.5" |
| thickness | 0.2" |
| gauss (each) | 3600 |
| distance from center of frame to center of each magnet 106: | 8.25" |

Figure 5:
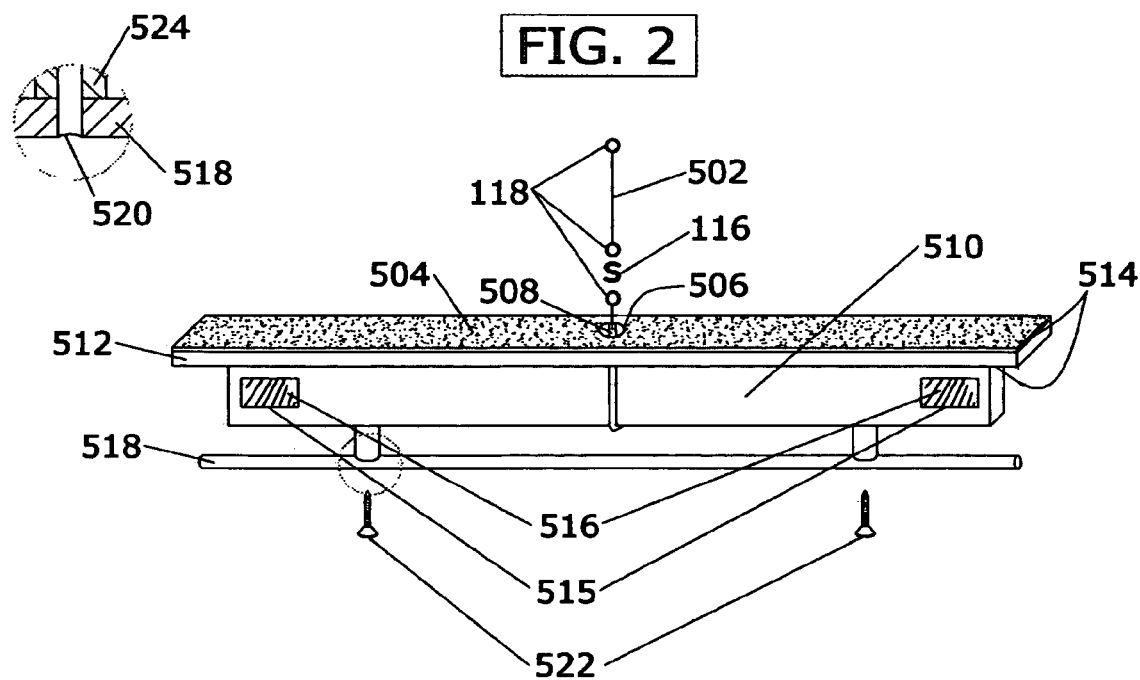
FIG. 5 is a perspective view of a suspended frame for displaying articles.

FIG. 5—A frame for Displaying Articles

FIG. 5 shows a Display that will accommodate sitting, and hanging, items. (See General note #3 on page 15.) Hook 202 from FIG. 2 goes through ring 118 on the top end of suspension 502. The bottom ring 118 holds hook 116, which goes through another ring 118 that is attached to cord 508. Hole 506 in shelf 512 allows cord 508 to pass through. The cord then encircles frame 510 to provide a secure lifting point. On the top surface of shelf 512 is hook-and-loop fastener 504; it will be used to fix small objects to shelf 512. Fastener 504 is put on shelf 512 using adhesive 514. Between frame 510 and shelf 512 is adhesive 514. Magnets 516 are put in holes 515. Rod 518 is attached to frame 510 by screws 522 passing through holes 520 and then spacers 524. Parts 510, 512, 518, and 524 are wood. Rod 518 may be used for displaying neckties for men, and other items.

Illumination of objects on, and/or, under shelf 504 could be designed into the FIG. 5 Display. Additional information regarding illumination is provided on page 33 under the section, "Comments that apply to FIG. 8A and FIG. 8B."

FIG. 6—Three Frames for Displaying Articles

FIG. 6 is an extension of the basic design of FIG. 5. In part, FIG. 6 is assembled using steps similar to those used for FIG. 5. Shelf 512 is not shown on FIG. 6, but it could be added. Cord 601 attaches ring 118 to frame 510. Cord 602 secures ring 118 to rod 518. Suspension 604 supports one frame 510 to the right end of rod 518. Suspension 606 supports the other frame 510 to the left end of rod 518. FIG. 6 includes three frames 510. The frames can be the same size—as shown on FIG. 6—or they can be different sizes. It may be seen that compared to the top two rods 518, the bottom rod 518 allows longer items to be displayed.

Models of FIG. 6 showed cycle times from less than 10 minutes to more than 6 hours. Even though there are few parameters, it is possible to design Displays that behave in dramatically different ways. For example: a suspension may have a length less than an inch, or longer than 3 feet; and magnets are available with magnetic inductions from less than 750 gauss, to greater than 10,000 gauss.

Each of the three frames of FIG. 6 can be made using different magnets. And, they need not be magnets of the same gauss on a given frame. But it is necessary for a frame to have magnets mounted so the same magnetic poles are on one side of the frame. Frame rotation is highly dependent on the magnets used. More frames can be added below the two frames on the lower levels of FIG. 6. There is also the possibility of designing frames that are balanced but not symmetrical. That can be done by suspending a frame at a point that is removed from its mid-point. For example: a 20" frame could be suspended at 5" from one end. And the frame could then be balanced so it would rotate in a horizontal plane.

With motor 226 turned on, the three frames 510 move, over time, in the forward and reverse directions. The lower two frames must follow the circular motion of the top frame. A good way to examine individual frame movement is to imagine an observer positioned next to the suspension that the frame hangs from. The observer would see the frame move forward, then stop, then go in reverse, then stop, then go forward . . . .

Figure 7:
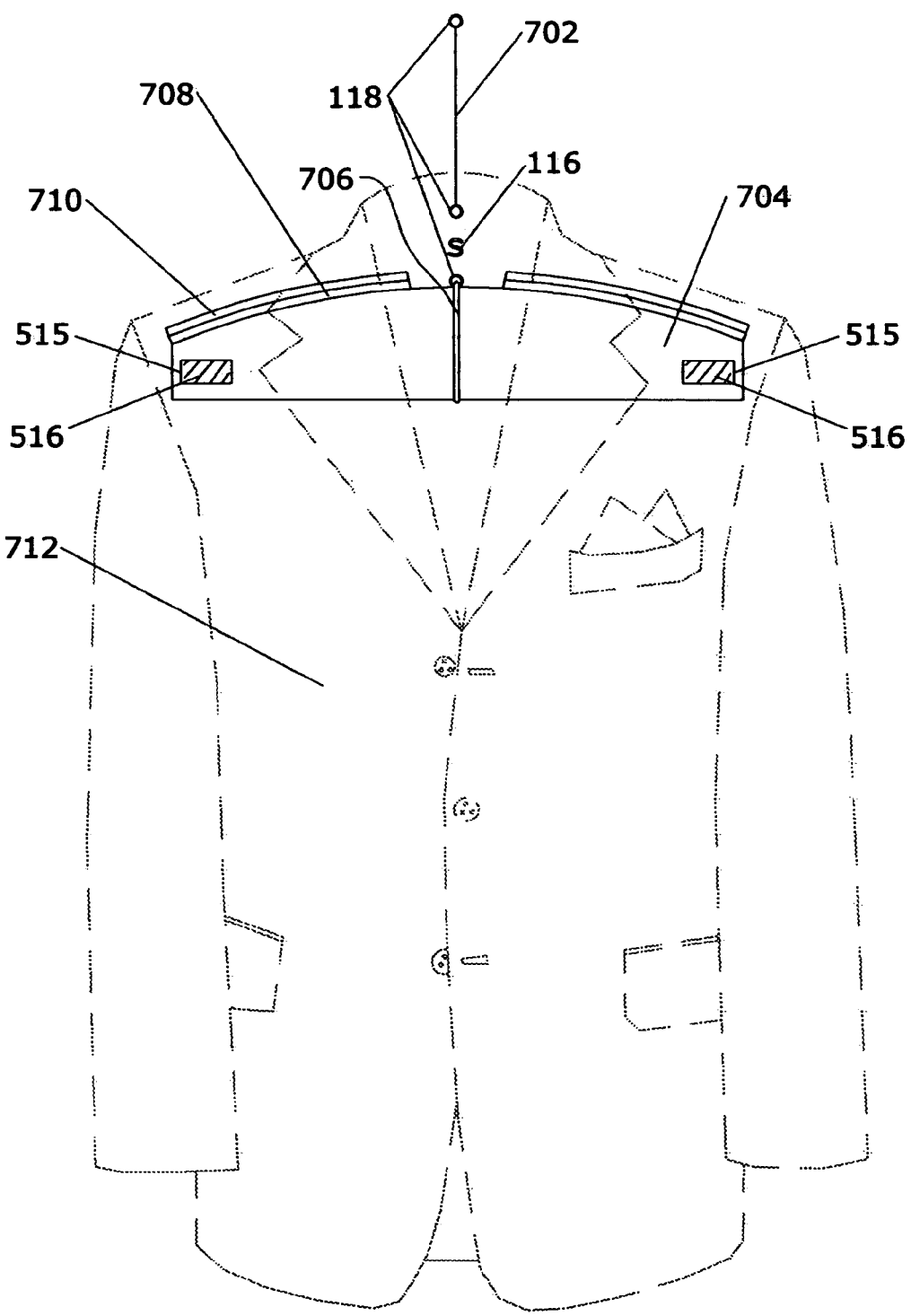
FIG. 7 is a perspective view of a suspended frame for displaying a garment.

FIG. 7—A Frame for Displaying a Garment

FIG. 7 shows garment 712 on wood frame 704. By garment is meant a, suit coat, sport coat, dress, blouse, etc. Several models of FIG. 7 were built and tested. The results were excellent. The garment turned slowly, and the reverse-rotation motion was impressive. Hook 202 from FIG. 2 goes through ring 118 on the top end of suspension 702. The bottom of suspension 702 has ring 118 that fits over hook 116. Frame 704, which includes recessed magnets 516 in holes 515, was balanced by hook 116 fitting in ring 118 that is attached to frame 704 by cord 706. Padding 710 was attached to frame 704 using hook-and-loop fastener 708. Padding 710 permitted garment 712 to look realistic by placing cotton batting in a fabric enclosure. (See General note #1 on page 14).

The model of FIG. 7 that gave the best results used a multi-strand steel cable. Its dimensions were 9⅜" long and 0.037" in diameter. This was, indeed, very significant for the Displays that must support more than a few pounds of weight. Obtaining excellent results using the above steel cable was reassuring from a practical standpoint. The cable that was used for FIG. 7 was able to support a 40 pound hanging load with no difficulty.

FIG. 8A—Three Shelves that Move Together

A hanging 3-level shelf assembly is shown in FIG. 8A. (See General note #3 on page 15.) At the top is FIG. 2 which includes hook 202. Shelves 810, 818, and 820 are 15" in diameter and made of ⁵⁄₁₆" plywood. Ring 802 fits over hook 202 and allows suspension 804 to carry the combined weight of a fully loaded display. Threaded rod 812 is placed in hole 811 in top shelf 810, then washer 817 is put on rod 812 from above, and nut 814 is put on rod 812. Another washer 817, and nut 814, are put on rod 812 from under shelf 810. Tighten the two nuts 814. The other 2 rods 812 are installed in shelf 810 the same way. Then the 3 hooks 842 are placed in the top holes 813 of rods 812. Now put suspension 804 in place by putting the 3 bottom rings 802 over the 3 hooks 842. Suspension 804 includes knot 805. The knot gathers 3 legs to make suspension 804. This stabilizes the 3-shelf Display. Hang top ring 802 from hook 202. Top shelf 810 is now complete.

FIG. 8A shows shelf 818 under shelf 810. Three suspensions 816 are used to hang the second shelf. Use the approach mentioned above to put shelf 818 in place.

Now take frame 824 and add magnets 516 in holes 515 and place screws 830 in holes 828 to fasten frame 824 under shelf 820. Then install extension 822 to shelf 820. That is done by putting adhesive 832 around the edge of shelf 820—use tape around extension 822 until the adhesive cures. The purpose of extension 822 is to protect frame 824. Now add shelf 820 to shelf 818 using 3 suspensions 816. Note that threaded rods 812 and nuts 814 can be used to level the shelves. If a design requires more magnets because of large size, or heavy weight, additional frames and magnets can be put under shelves 810 and 818.

The 3 shelves of FIG. 8A rotate in the forward direction because of motor 226 in FIG. 2. They rotate in the reverse direction because of magnets 516 in frame 824 that is mounted under bottom shelf 820. The motion of shelves 818 and 810 simply follow the motion of shelf 820.

All reverse-rotation of FIG. 8A results from torsion in suspension 804 that comes from forces which are produced by magnets 516 sometimes working with, and sometimes in opposition to, the Earth's magnetic field. There are 6 suspensions 816 used in FIG. 8A: 3 are used to support shelf 820, and 3 are used to support 818. None of the 6 accumulates torsion from motor 226.

There is one critical part involved in the operation of FIG. 8A: suspension 804. Selecting and testing materials for suspension 804 should permit good workable Displays. Several materials are recommended: small diameter nylon cord and high strength fishing line.

Three shelves are shown on FIG. 8A. There could be less or more than that number. The shelves should be made of nonmagnetic material: wood, plastic, aluminum, etc. They can be round, square, or another shape. Shelf thickness depends on the application. Hook-and-loop fastener material can be put on the shelves to secure objects.

FIG. 8B—Three Shelves that Move Independently

Shelf 809 is 11" in diameter; shelf 815 is 13" in diameter; shelf 820 is 15" in diameter. All 3 are ⁵⁄₁₆" thick plywood. FIG. 8B resembles FIG. 8A, however, there is one significant difference. Each of the shelves of FIG. 8B can rotate forward, or reverse, independent of the other 2 shelves. (All 3 shelves of FIG. 8A always move in the same direction at a particular time.) Suspensions 806, 807, and 808 in FIG. 8B all accumulate torsion. That's true, in part, because of magnets 846 located in holes 844 in frame 819 (under top shelf 809). But, if frame 819 is removed, all 3 suspensions will still accumulate torsion. However, the extent of reverse-rotation motion is increased by the addition of frame 819. In a similar way, the addition of another frame with magnets under shelf 815 will further increase reverse-rotation motion. (See General note #3 on page 15.)

An example of typical motion shows one shelf going clockwise, one stopped, and one going counterclockwise at an instant of time. Such motion should be very interesting to watch. Shelf 815 (the middle shelf) does not have magnets. But, since it's trapped between shelf 809 and shelf 820, it will reverse-rotate like the two shelves with magnets.

Starting from the bottom, FIG. 8B is assembled as follows. Shelf 820 is identical to the bottom shelf of FIG. 8A. It is hung from shelf 815 using suspension 808. Shelf 815 is hung from shelf 809 using suspension 807. And shelf 809 is hung from hook 202 of FIG. 2 using suspension 806. Note that hanger 803 ends with ring 802. There are 9 places where hangers can be attached. That's because there are 9 holes 813 in rods 812 under the three shelves. Nine hooks 842 can be put in these holes. Objects can be attached to rings 802.

Shelf 809 has hole 833 in the center. Hole 833 is countersunk so the top of screw 834 will be flush with shelf 809. Screw 834 is 2" long. It has hole 836 located a ¼" from the threaded end. Hole 836 is ⅛" in diameter. Screw 834 is placed in hole 833. It is held in place by washer 838 and nut 840. Extension 848 is added to shelf 809 using adhesive 832. It protects frame 819 under shelf 809. Shelf 815 is added in a similar way.

All 3 suspensions, 806, 807, and 808 are critical elements of FIG. 8B. Weight is the primary consideration. Suspension

806 offers the most challenge since it must support the greatest weight. Careful selecting and testing of flexible materials should result in good workable Displays. As mentioned previously, small diameter nylon cord and high strength fishing line are recommended.

Three shelves are shown on FIG. 8B. There could be less or more than that number. The shelves should be made of nonmagnetic material: wood, plastic, aluminum, etc. They can be round, square, or another shape. Shelf thickness depends on the application. Hook-and-loop fastener material can be put on the shelves to secure objects.

Comments that Apply to FIG. 8A and FIG. 8B.

The following important test should be performed upon completion of FIG. 8A or FIG. 8B: Make certain that frames are assembled so the north-seeking poles of the magnets are on the same side of each frame. Reverse-rotation motion depends on that positioning. Either pole of a spare magnet can be used to verify this.

One interesting feature could be added to FIG. 8A and FIG. 8B. Rechargeable batteries, and lights (LEDs, or other) could be mounted under both upper shelves. That would be shelves 810 and 818 for FIG. 8A—and shelves 809 and 815 for FIG. 8B. Such lights could illuminate objects on the next lower shelf. Also, in the case of FIG. 8B, lights could illuminate articles hanging from hangers 803. Each of the 3 shelves of FIG. 8B could have 3 hangers 803. Batteries and lights could also be mounted under bottom shelf 820. That way all 9 hangers 803 could be illuminated. Small spotlights mounted under the shelves could be used for special emphasis.

Such a Display, located in a dark area, with objects sitting on the shelves—hanging and illuminated—that were rotating and reverse-rotating, would be something to see. That would capture almost anyone's attention!

Figure 9A:
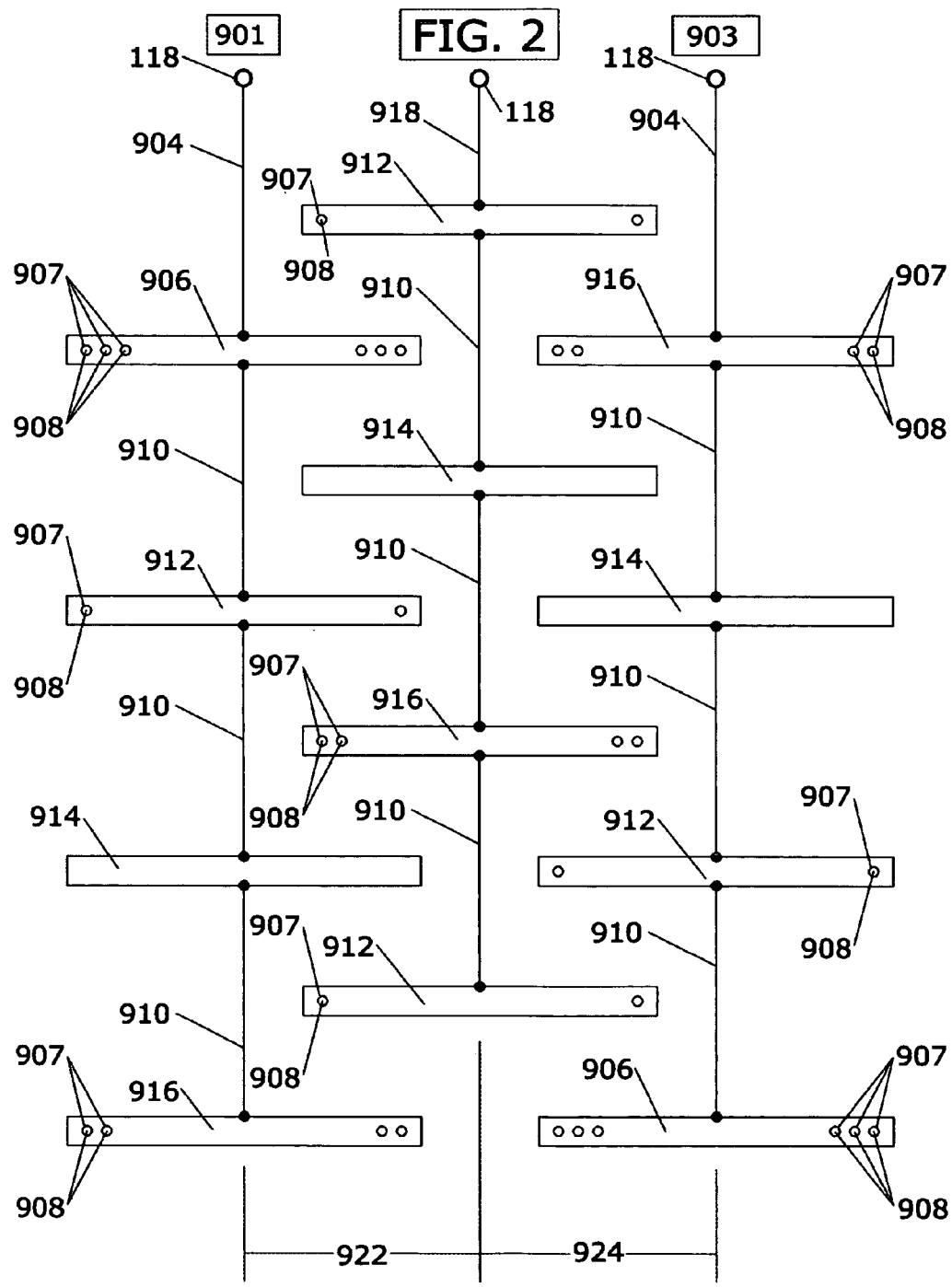
FIG. 9A is a perspective view of twelve suspended frames for displaying articles.

FIG. 9A—A Display of Twelve Frames

FIG. 9A shows an assembly of 12 frames. It could have less or more. It is powered by 3 motor assemblies.

| motor assembly | Reference Numeral | motor rpm | rotation |
|---|---|---|---|
| 901 | 227 | 1.5 | ccw |
| FIG. 2 | 226 | 0.8 | cw |
| 903 | 229 | 2.0 | ccw |

Assemblies 901 and 903 are different from FIG. 2 only by the motor involved. The above summary shows the relevant information. FIG. 9A could, of course, operate using 3 assemblies all like FIG. 2. Three speeds and 2 directions of rotation should provide more interesting motion.

There is symmetry in the arrangement of the frames; but that is not necessary. The symmetry allowed suspension 910 to be used 9 times. That simplified FIG. 9A.

Before describing the operational characteristics, several practical uses will be listed.

1) Some, or all, of the frames could include features from other figures.
    a) Shelf 512 and rod 518 from FIG. 5 would permit sitting and hanging objects. Small geometric figures could be hung from rod 518. Or, an arrangement of our solar system. On shelf 512 could be small toy animals, airplanes, automobiles, etc. All the items would rotate in a way that would be certain to attract attention.
    b) Ball 102 and ball 109 from FIG. 1E could be part of FIG. 9A.
    c) The garment Display of FIG. 7 could be adapted to FIG. 9A.
2) The 12 frames could accommodate an array of similar, or dissimilar, items or products. The following paragraph addresses that possibility.

A large store that specializes in women's blouses could use FIG. 9A to demonstrate 12 models. Frames could use the garment Display from FIG. 7 to create a unique way for customers to observe blouses. The Display could be arranged so none of its parts were visible: the motor assemblies could easily be hidden; the frames would be under the blouses; and suspensions could be covered by neck extensions that are part of the forms the blouses fit over. All of this would be in a store window, or other location. A height of 12 to 15 feet would be required from ceiling to floor. Less height would be needed for fewer vertical frames.

The example involves blouses—it could be men's ties, or holiday decorations, etc. The primary feature is the motion that is present. Using the material in this application, a Display could be made to allow an observer to see 12 blouses moving, generally, like this:

1) Five would be moving forward. Their locations on FIG. 9A would be random. Their speed would be from about 0.1 to 3 rpm.
2) Five would be moving in the reverse direction. Their location would be random, too. But their speed would be a little less, about 0.1 to 2 rpm.
3) Two of the 12 would be stopped.

In just a few seconds, the above situation would be quite different. Because FIG. 9A uses 3 different speed motors—with cw and ccw motor rotations—and there are four different frame designs, its virtually certain that the 12 frames will have different cycle times. This does not rule out the possibility that some frames seem to be rotating in the same direction, and at the same speed at a particular time. However, if the frames are watched for a short time, their motion will differ noticeably.

Variations in the design of FIG. 9A will produce very different results. Just as with the previous Displays, the parameters can be selected for a particular purpose. In addition, FIG. 9A has spacings 922 and 924 that allow considerable design freedom.

FIG. 9A—Construction

At the top left of FIG. 9A is motor assembly 901. Under that is suspension 904 which holds frame 906. Below that is suspension 910 which holds frame 912. Under that are frames 914 and 916. The individual steps to assemble the 4 frames are like the sequence for placing balls 109 and 102 in FIG. 1E. Hooks and rings could be used, but they have been discussed several times already.

FIG. 2 (in the middle) and 903 (on the right) are then assembled in similar fashion. Below FIG. 2 is suspension 918. It supports the total weight of the mid-portion of FIG. 9A. Spacings 922 and 924 can be 0.6 to 3 times the frame length. Depending on requirements, designs can be quite different from these suggestions.

For simplicity, all 12 frames are the same size. However, they have 4 different magnetic properties:

| frame | magnets 908 | gauss per frame |
|-------|-------------|-----------------|
| 906   | 6           | 22,200          |
| 912   | 2           | 7,400           |
| 914   | 0           | 0               |
| 916   | 4           | 14,800          |

Each magnet 908 is rated at 3700 gauss. Magnets 908 are recessed in holes 907. In all cases, a frame with more magnets and/or stronger magnets will present a greater opposition to rotation. That's because a frame with more gauss enjoys a greater bond of attraction with the Earth's magnet field. Consequently, more torsion is required in a suspension to pull the frame from its static position. This causes a delaying action compared to a frame with less gauss; the result is slower initial rotational speed, and greater rotational speed later. The total magnetic induction for FIG. 9A is 118,400 gauss. (This number is simply the gauss per magnet (3700) times the total number of magnets on FIG. 9A.) The magnetic induction could be increased or decreased by scaling the parameters.

The 12 frames should be positioned to minimize the mutual coupling effects of the 32 magnets involved. For example, consider the first frame 906 below motor assembly 901. It has 3 magnets 908 on each end. The closest frames are the top 2 frames 912 and 914 hanging from assembly FIG. 2. FIG. 9A shows one magnet from frame 912 comes close to the three on either end of frame 906. Frame 914 does not have magnets. That positioning minimizes the unwanted magnetic forces that cause these delicately balanced frames to be disturbed. Frame wobble, and hesitation of rotation, result from excessive mutual coupling. Both are undesirable: wobble causes a frame to move above or below the horizontal plane of rotation; hesitation is a temporary blockage of a frame's rotation.

At the bottom are separations 922 and 924. These separations could be a bit closer. Or, they could be farther apart. Greater separations, either horizontally or vertically, reduce the problems caused by mutual coupling mentioned above.

The frames that have no magnets, will reverse-rotate because of the torsional force that exists—in the suspensions—above and/or below their location. Such frames will go in the reverse direction at regular intervals no matter where they are placed in FIG. 9A.

The motion of all the frames—with some frames stopped at a particular time, and others at constantly changing speeds—coupled to the cw and ccw turning of the motors, and the 3 motor speeds, should capture anyone's attention.

FIG. 9B—Assembly of a Frame and Three Crystals

At the top of FIG. 9B is motor assembly FIG. 2. Ring 118 fits over hook 202 of FIG. 2; then suspension of 950 is attached to crystal 952. Suspension 954 goes from the bottom of crystal 952 to the top of frame 956. Magnets 908 are recessed in holes 907 near the ends of frame 956. Connection 958 is just long enough to attach top of crystal 960 to bottom of frame 956. Connection 958 is non-flexible; it causes crystal 960 to rotate in synchronization with frame 956. Suspension 962 attaches bottom end of crystal 960 to top end of crystal 964.

A model of FIG. 9B was constructed of glass crystals that were 2½" wide. The suspensions were about 4" long, and were made of 4 side-by-side pieces of heavy duty nylon thread. Frame 956 was 3" long, and the magnets were separated by 2¼".

The model was centered in a window where direct sunlight was present. Beautiful large areas of refracted and reflected light moved around the room, and through doorways into adjacent rooms. Each of the crystals moved, typically, at a different speed and in a different direction than the one next to it. Just as with previous Displays, the reverse-rotation motion comes from magnets 908 being positioned so their similar poles are on the same side of frame 956. The distance between the magnets, and the gauss of the magnets are the primary design characteristics. Large crystals with large facets produce dazzling show of spot rainbows when direct sunlight is present. The counter-rotation of bright colors coming from the large facets of the crystals creates a fascinating environment for an observer.

Models of FIG. 9B could, of course, be made with one frame and one crystal, or with multiple frames and crystals. Twelve rotating crystals could be configured using the general plan of FIG. 9A. Such an array could produce spectacular results.

Below is a summary of a series of tests that were run using a model similar to FIG. 9B. The only difference was the test model used 3 identical crystals that were octagonal in shape and 2½" across. The reference numerals from FIG. 9B will be used to identify the parts. The motor (of FIG. 2) rotated at 0.8 rpm as viewed from above.

Test #1. Frame 956 was attached to crystal 960 by connection 958 as shown on FIG. 9B. Good reverse-rotation motion was seen from all 3 crystals.

Test #2. Frame 956 was positioned below crystal 964. This test showed all 3 crystals did reverse-rotate. However, the motion of crystals 952 and 960 was less than the 2 passive crystals in Test #1.

Test #3. Frame 956 was positioned below crystal 952. Again, all 3 crystals did reverse-rotate. This configuration provided the best overall movement of colorful light spots moving around the room.

Conclusions: Each of the tests produced reverse-rotation. The best results came from Test #3. After that came Test #1, and last was Test #2. "Best" indicates the most active movement of reverse-rotating light spots from the 3 crystals.

Results are the same if frame 956 is above, or below, the nearest crystal since connection 958 secures the frame to the crystal. Just as with other Displays, the length of the frame, and, more specifically, the distance between the magnets, and the gauss of magnets, are primary considerations. Other things being equal, greater distance between magnets will slow down the motion. The design guidelines presented earlier can be used to construct reverse-rotating crystal Displays that satisfy a broad range of applications.

Figure 10:
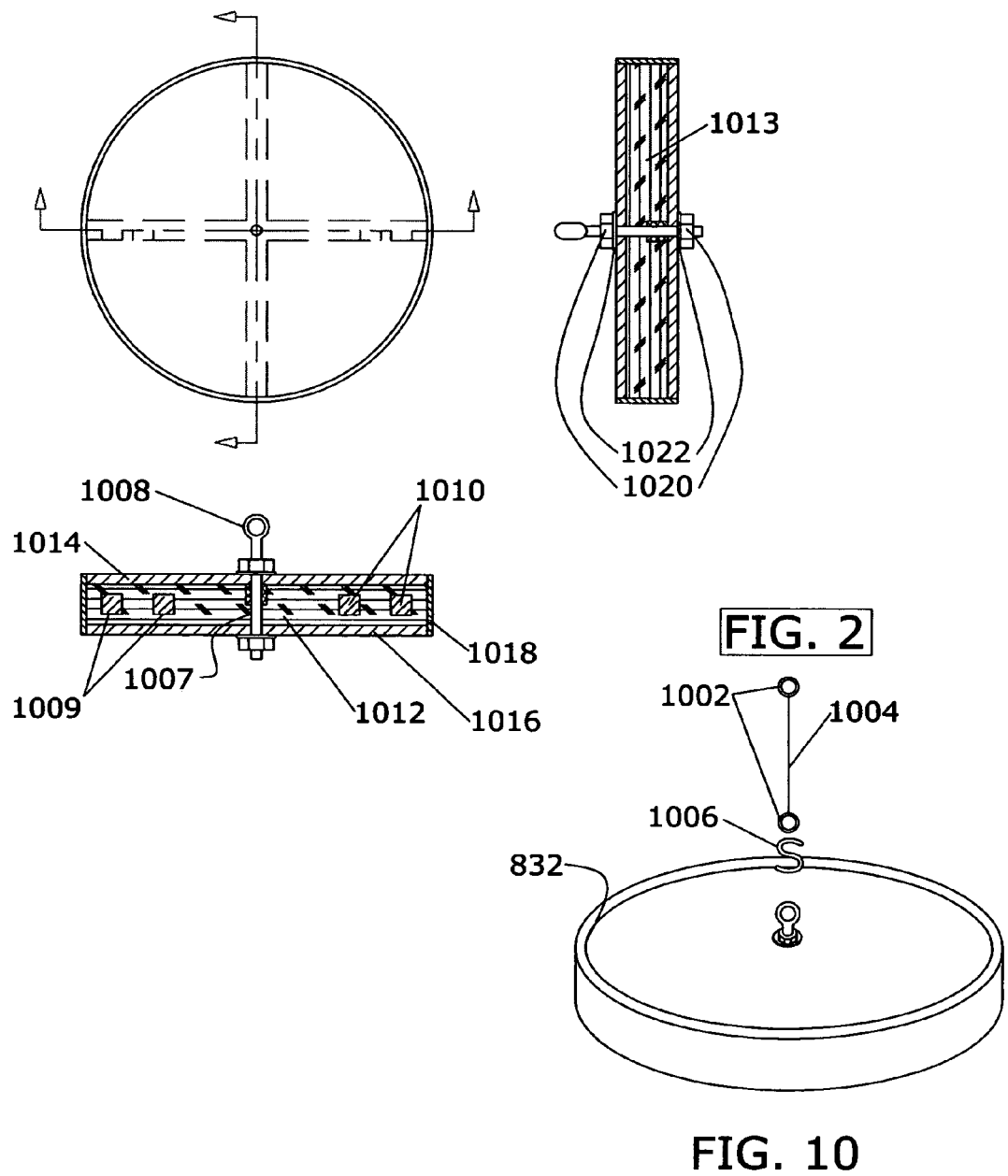
FIG. 10 is a perspective view of a suspended flywheel.

FIG. 10—Flywheel Description

At the top of FIG. 10 is ring 1002. It permits suspension 1004 to be hung from the FIG. 2 motor assembly. Ring 1002 at the bottom of the suspension fits over hook 1006. The other end of the hook goes through eye 1008. Hole 1007 goes through the center of the flywheel as shown in FIG. 10. The threaded part of the eye along with washers 1022 and nuts 1020 clamps top 1014, bottom 1016, and frames 1012 and 1013 together. Frame 1012 has, near the ends, 2 magnets 1010 that fit in holes 1009. Two more magnets 1010 are positioned on frame 1012 to increase the performance of the flywheel. More magnets could be added—especially for large flywheels with longer frames. There are no magnets associated with frame 1013. (Tests showed that magnets placed in frame 1013 are a hindrance to flywheel operation.) Side 1018 along with top 1014 and bottom 1016 form an enclosed cylinder. Adhesive 832 is used to attach side 1018.

Rotational efficiency is increased by using a cylinder. Wind loss is reduced with a cylinder compared to other shapes. Therefore, such a flywheel is able to reach greater speeds.

Here are some dimensions for a 24" flywheel. Top 1014 and bottom 1016 are ⁵⁄₁₆" plywood. They are 23¾" in diameter. Side 1018 is ⅛" thick plywood. Wood frames 1012 and 1013 are 1"×4"×23¾". Frame 1012 has 4 holes 1009 that are ½"×2"×2". Frame 1013 does not contain magnets. Suspension 1004 is 24" long. The threaded part of the eye 1008 has 6" of ¼"-20 thread.

With no power applied, and FIG. 10 at equilibrium, all 4 magnets 1010 must have their north-seeking poles on the same side of frame 1012. This provides maximum capability of the flywheel. Additional information regarding flywheels appears later.

FIG. 11–Graph of Ball Rotation vs. Time

A graph of data taken while testing a model of FIG. 1*b* is shown on FIG. 11. The parameters were:

| | |
|---|---|
| motor 226 | speed 0.8 rpm, cw from above |
| suspension 120 | two heavy duty nylon threads, 24" long |
| ball 102 | basketball |
| frame 104 | wood |
| magnets 106 | four NE153N |

The graph shows ball 102 rotations vs. time. One full cycle of the ball starts at 10 minutes and ends at 82 minutes. The time interval from 0 to 10 minutes is shown by two parallel lines. Those 10 minutes were part of the previous cycle. And the parallel lines indicate that ball 102 was rotating forward and reverse less than 1 rotation in each direction. At 10 minutes, a stopwatch was started at the exact time ball 102 completed one full rotation. The ball then rotated 65¼ continuous times in the forward direction. FIG. 11 shows that as a straight line on the left of the graph. After the ball rotated 65¼ times, it stopped for several seconds. It then went the reverse direction as depicted on FIG. 11. It then stopped again, for several seconds, and moved forward. And so it went until at 46 minutes, ball 102 had used up its energy reserve that came from the previous cycle (mentioned above). From 46 minutes, until the end of the cycle at 82 minutes, the ball made dozens of forward and reverse partial rotations. That time interval is shown as two parallel lines that are separated by less than 1 rotation in each direction. The cycle lasted a total of 72 minutes. Then, a new cycle began because of accumulated torsion in suspension 120. FIG. 11 shows the start of the new cycle on the far right of the graph.

Note that the new cycle began at 82 minutes and 66 rotations on FIG. 11. The 82 minutes was discussed above. The following relates to the 66 rotations. FIG. 11 will be divided into parts: The first is, 10 minutes to 46 minutes, and the second, 46 minutes to 82 minutes.

1) For the first part, all forward rotations of ball 102 were added: the total was 134. And all reverse rotations of ball 102 were added: the total was 69.

2) In the second part, the dozens of forward and reverse partial rotations added to essentially zero rotations.

Using the information from #1 above, there were 65 more forward rotations than reverse rotations. To that number, 1 rotation has to be added because a new cycle starts as indicated earlier after 1 full rotation of ball 102. Therefore, a summation yields:

rotations from part 1+rotations of part 2+1=total rotations (134−69)+0+1=66 rotations Now, if there were no magnets involved, ball 102 would have rotated one time for each turn of motor 226. In 72 minutes, that would have been 72 minutes×0.8 rpm=58 rotations. If a comparable graph (to FIG. 11) was prepared, it would show 0 rotations at 10 minutes, and at 82 minutes there would be 58+1=59 rotations (the 1 comes from above). Such a graph would show a straight line between the points (10, 0) and (82, 59). This means the cycle graphed on FIG. 11 had 7 rotations more than might have been expected (66−59). Numerous tests show that a cycle can have more, or less, rotations than the number of times the motor turns during the cycle. Quite often the difference is less than ±10%, but it can be more than ±20%. The difference for FIG. 11 was +12%.

The end point of the cycle on FIG. 11 is elevated above the starting point, because in the long term, motor 226 will prevail over the Earth's magnetic field in the operation of these Displays.

Figure 12:
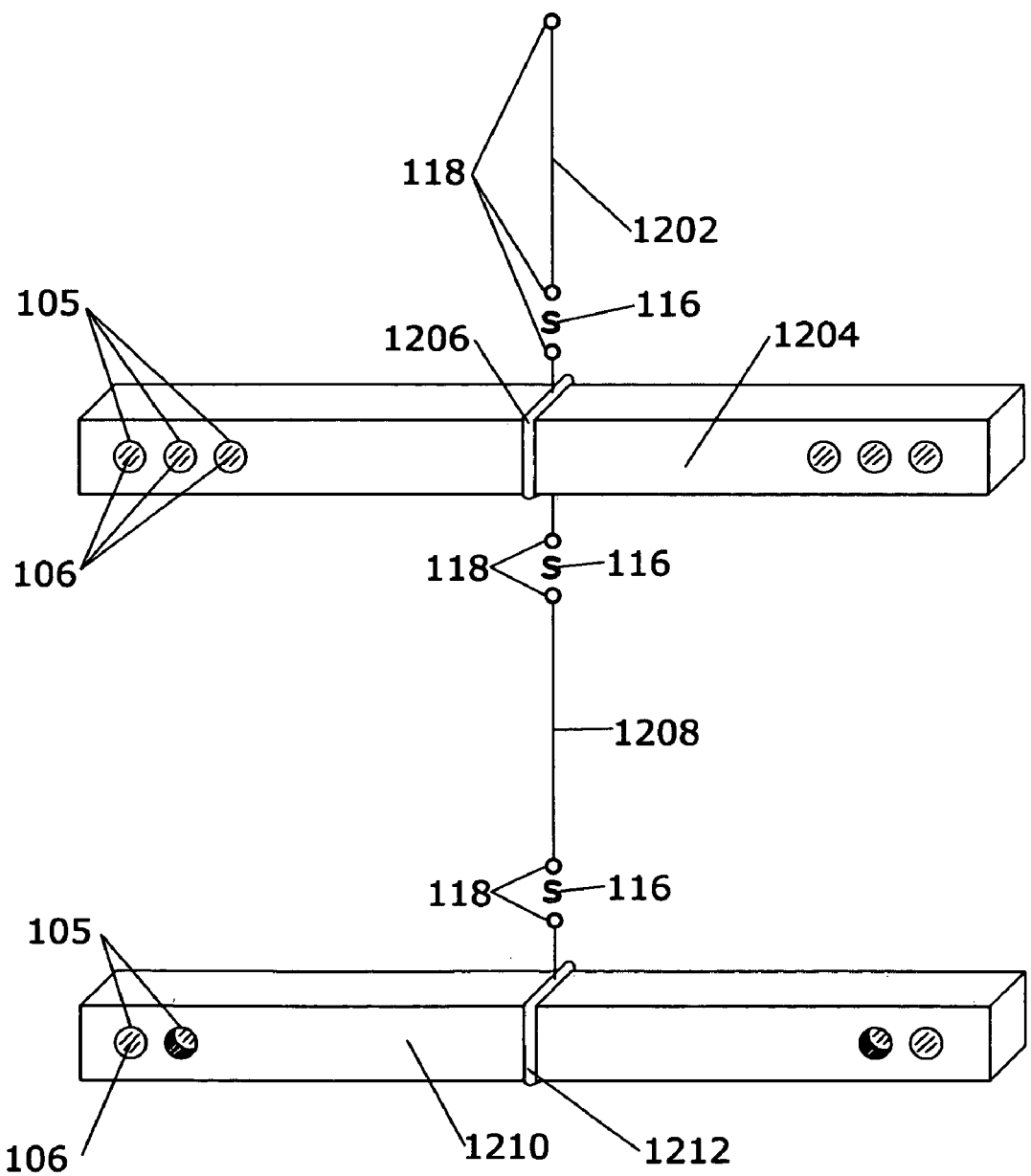
FIG. 12 is a perspective view of two suspended frames for student exercises.

FIG. 12—The detailed description of FIG. 12 starts on page 55. FIG. 12 is an extension of FIG. 3, the basic Display. In addition, several detailed student exercises are included along with the information.

Sequence of Steps for Use by Teachers Regarding FIG. 1A

This section deals with observing the unusual behavior of the ball 102, and finding the precise reason for the reverse-rotation motion. The steps below—or variations of these steps—can be used by a teacher to lead students on a path that is both interesting and educational. A working model of FIG. 1A is required to get started. There is the possibility that when FIG. 1A is first introduced to a class, the students may loose interest in other material that the teacher may wish to cover. This could continue for subsequent classes, too. So, it is suggested that FIG. 1A be placed where it cannot be seen until the teacher is ready to discuss it. Perhaps the last portion of the first few classes could be used to observe FIG. 1A and the motion of ball 102.

1) At the outset, the teacher needs to explain that the rotating ball in FIG. 1A will be used to acquaint the students with important science concepts. It should be made known that no student is to touch any part of FIG. 1A until the teacher says its okay to do so.

2) Starting with this step, an organized plan will allow students to be "detectives" in learning what is important in the experiment. Such a plan would combine presentation of the essential theory of rotating objects, and observations of FIG. 1A. Classroom discussions should be interesting. The detective part builds on the leadership the teacher provides along with the resourcefulness of students in analyzing the motion of the preferred embodiment, FIG. 1A.

3) From the time FIG. 1A is first observed, there will be a priority in knowing what is hidden in stands FIG. 1*c* and FIG. 1*d*. The organized plan from step 3) should include these stands. There are many possibilities for teachers. For example, a sequence could be devised that would consider every detail of FIG. 1*c* and FIG. 1*d*. To start with, spacing 178 could be changed to see how ball 102 is affected. After that, a stand could be disassembled in a systematic way while testing continued so students could learn what is inside. Then, as that progresses, the two extra boxes 160—that were made during the assembly of FIG. 1c and FIG. 1d—could be circulated among the students. Even that could be done in steps: first the 2 brass cubes could be put in boxes 160 with clear lid 176 fixed to the top. Later, when the brass discs are found in void 150, they could be added . . .

4) Based on the above, its likely some students will—because cubes 166 were hidden in boxes 160, and discs 152 were hidden in voids 150—believe there may be more hidden in uprights 142 and 174, and/or, in bases 134. That's good. That's part of the intrigue. So, those pieces too, can be disassembled and circulated.

5) The steps should provide useful, and interesting class discussions. But, in the end, its most important that students understand the science involved.

Interpretation of Certain Test Results

It is believed that deviations in cycle times are due, primarily, to the angular position of a frame, relative to magnetic north, at the instant the frame stops moving forward. These comments are based on the forward direction being clockwise, as seen from above. Some frames hesitate seconds longer than average before stopping and reversing direction. Frames that experience such delays have longer cycle times. And, test results show, these delays affect the cycle underway, and the next cycle, too.

Below is a possible explanation of why delays happen. FIG. 3 shows frame 304 and FIG. 4 shows a graph of the motion of reference point 312 on frame 304. The graph of FIG. 4 is a record of one full cycle of frame 304. FIG. 3 and FIG. 4 were treated earlier. Here, we are especially interested in stop point 412 on FIG. 4. That's the exact position where frame 304 made its first stop, after rotating forward more than 6 times at the start of a new cycle. Point 412 is located in quadrant 404. Frame 304 stopped because its inertia had been expended. And when it stopped, the north-seeking poles of its magnets were facing almost due east. Based on results involving more than a dozen different frames, a frame nearly always has its first stop after multiple forward rotations with its north-seeking poles facing either east or south. A frame will usually stop in quadrants 404 or 406. It is more likely to have a cycle time that deviates less than 15% from the average when stopping in these two quadrants. For those unusual situations where a frame stops with its north-seeking poles facing west or north—quadrants 408 and 410—deviations in cycle time can be 20%, or more. Once again, all this is based on a motor that rotates clockwise, as viewed from above. If the motor is reversed, all the comments are reversed. Deviations in cycle times, can, to a lesser extent, arise from hesitations that accompany subsequent stop points like points 414 through 430 on FIG. 4.

All references to magnetic north, and north-seeking poles, are used to convey an indication of how these Displays function. The south magnetic pole, and south-seeking poles of the magnets, are, of course, equally important in the operation of these Displays.

In order for reverse-rotation to take place, it is necessary that magnets be mounted so their similar poles are on the same side of a frame. With the magnets properly mounted, the long dimension of a frame will, in a matter of minutes, point east and west. This is due to the way these neodymium magnets are made. All the magnets used have their magnetization through their thickness. The dictionary defines "magnetization" as, "a magnetizing or state of being magnetized". The magnets are made in a way that causes their north-seeking pole to be on one side of their thickness, and their south-seeking pole on the other side.

Before the power to the motor is turned on, a frame that has its long dimension pointing east and west, and not moving even a little bit, is at static equilibrium. Such a frame will remain that way if it is not subject to changes in the ambient magnetic field, or air currents.

When power is turned on, there is a period of time during which a frame tries to ignore what has happened. Depending on the design parameters, a frame may stay in the static position for seconds, minutes, or tens of minutes. As the motor shaft turns, the top part of the suspension turns with the motor. But, the bottom end is, temporarily, unable to turn because the frame is held captive by the forces associated with the magnets and the Earth's magnetic field.

The accumulation of turns in a suspension causes torsion. As the torsion increases, a frame moves from its initial east-west position a noticeable distance in the forward direction. When the torsional force builds up to where its magnitude approaches the sum of the two linear forces, from the magnets, the rotation of the frame increases. Later, the frame starts rotating freely in the direction the motor shaft is turning. By the time the frame completes several revolutions, it is moving about 2 or 3 times faster than the motor rpm. Forward motion continues until the frame has moved beyond the point where the torsion in the suspension is zero. This creates a negative torsional force that is due to an increase in the momentum of the frame. There comes a time when the frame will stop. Of necessity, it then moves in the reverse direction owing to the negative torsion. Several models tested went in the reverse direction more than 25 continuous rotations. The motor continues in a forward direction regardless of the motion of the frame.

After the frame stops turning, there is a time in which it oscillates forward and reverse. This continues until the suspension once again stores enough turns to produce a torsional force sufficiently large to cause a new forward cycle to begin. (One cycle can last a few minutes, or multiple hours.) Cycles continue, one after another, as long as the motor keeps turning. Because of how these frames are balanced, and the very small forces are involved, they require relatively still air.

Observations from Testing FIG. 1E

It was easy to spend time working with variations of FIG. 1E. Results from that Display created an interest in making further observations. Below are several definitive statements regarding balls 102 and 109. There are also some questions and answers that indicate more work is needed to understand the motion involved. The basic consideration relates to how the magnetic forces are coupled from one ball to another via the suspensions.

Some of the following ball configurations require greater vertical height than portable stand 101 was designed for. Either stand 101 could be modified, or, the FIG. 2 motor assembly could be attached to a surface that provides the required height.

If only ball 109 is rotated in stand 101, it will never reverse direction.

If only ball 102 is rotated in stand 101, it will reverse direction at regular intervals.

Question: Will ball 109 ever reverse direction if ball 109 is positioned on top, and ball 102 is at the bottom—as depicted in FIG. 1E? The answer is yes.

Question: Will ball 109 ever reverse direction if ball 102 is positioned on top, and ball 109 is at the bottom? The answer is yes.

Questions: Will each of the three balls reverse direction if ball 102 is on top, and ball 109 is under it, and then another ball 109 is hung under the first ball 109? The answer is based on a guess since no such test has been observed. Its likely they will.

Questions: Will each of the three balls reverse direction if ball 109 is on top, and another ball 109 is under it, and, ball 102 is at the bottom? The answer is not known at this time. (This would be an excellent student exercise. Not just to know the answer, but to learn the science.)

Note that each ball has, at its equator, vertical line 110. Its a reference line for keeping track of rotational motion.

General Design Considerations for Displays

Dozens of tests were run, starting with frames that were operating in the reverse-rotation mode to explore the ranges of the parameters that yield reverse-rotation motion. Only one change was made at a time. From the results, it was possible to discern some general trends. A summary of the changes and their results is listed below. The arrows indicate increases and decreases. The following material is tentative. It is difficult to generalize, and simplify, rotational motion that can be complex. For example, some frames, in the course of a cycle, exhibit very different modes of stopping and starting.

| parameter | symbol |
|---|---|
| suspension length | sl |
| suspension diameter | sd |
| motor speed | rpm |
| magnetic induction | gauss |
| distance between magnets | dbm |
| cycle time | ct |
| load capacity | lc |

Note: Load capacity is the ability of a Display to continue to reverse-rotate as more weight is added to its frame.

| change | result |
|---|---|
| sl ↗ | ct ↗ |
| sd ↗ | ct ↘ |
| rpm ↗ | ct ↘ |
| gauss ↗ | ct ↗ lc ↗ |
| dbm ↗ | ct ↗ lc ↗ |

These results give useful insights and are helpful for design purposes. During the testing, some of the operating limits were determined. However, many details remain unknown. Various sizes of Displays can be constructed by "scaling" parameters from working models.

Some additional relevant material will now be presented. FIG. 3 will be used as a reference: it is the simplest of Displays. The others are variations of FIG. 3 including the flywheel (FIG. 10). All Displays have, as a minimum, the following features.

Motor—The motor speed can be from 0.1 to about 3.0 rpm. It may be possible to produce Displays that work up to, and above, 10 rpm by carefully choosing parameters.

Suspension—Length, diameter, and composition of a suspension are all important. Suspensions appear to be the most complex part of these Displays. Learning about their characteristics requires considerable time. Dozens of suspensions have been evaluated. Test results show that it can be difficult to predict how different suspensions affect motion. Successful results were obtained from suspensions that were less than 1" long; others were, 1" to 24"; some were more than 24" long. Long suspensions produce long cycle times which are not generally useful for teaching.

Frame length—Ball 102 had a frame that fit snuggly inside a basketball. The length was 9¼ inches. The garment frame of FIG. 7 was 16" long, and the frame for FIG. 5 was 24 inches. The shortest frame tested was 2" long. It gave good results. Frames from 2" to 48" were tested. All produced reverse-rotation motion. More than 30 frames were tested: about 20 had lengths of 8" to 18".

Magnets—Tests showed that, ceramic, ferrite, and other ordinary magnets do not have the needed strength to arouse interest. Rare earth neodymium magnets give excellent results.

All the areas just mentioned can provide exceptional opportunities for science teachers and students. At present, what is known has come from observations. That, of course, is how science moves forward: The empirical leads to theory.

Several models tested showed ball 102 would rotate in the forward direction about two-thirds of the time. And, one-third of the time, it would be stopped or moving in the reverse direction. Typically, the ball stops rotating for about 2 or 3 seconds. It then reverses direction; it may go about a rotation and then stop again. There may be a few, or many, similar oscillations. Then, a build up of torsion in the suspension, causes the ball to move forward multiple rotations. After that, the ball will stop and reverse again. The cycle then starts over.

In general, a cycle can require a few minutes, or multiple hours. It depends on design. From a practical point, cycle times of about five minutes seem to be quite useful. However, there may be situations where very short, or very long, cycle times are desired. Based on testing, all cycles consist of a period where multiple forward rotations take place, and, following that, a period where forward, and reverse, oscillations occur. That latter period is necessary for torsion, in a suspension, to build up to move a frame into the next cycle. FIG. 4 shows how the frame of FIG. 3 moved during one cycle. The text for FIG. 4 explains the graph.

A frame can be made to look like a fish, or canoe, or colorful cylinder, etc. An airplane could be used in a Display. The fuselage could contain a frame, and the plane could be balanced with one wing down slightly giving the appearance the plane is turning.

Fundamental Questions and Information

Many of the questions that came up while testing Display models were answered by additional testing. To a large extent, the materials presented in this application are the result of asking questions and looking for answers. It was not unusual to require multiply tests of a particular model to make certain that the results were consistent. However, after all testing was completed, one very important question remained unanswered: Was it possible to cause a working Display (like FIG. 3) to stop going in the reverse direction? The question assumes that no design changes are made.

Before continuing, it seems useful to restate the reason for the reverse-rotation motion. The behavior of these Displays is due to magnetic forces. These forces come from magnets (correctly positioned on a frame), and the Earth's magnetic field. There are two ways to check on the correctness of the previous statement. First, start with a Display that produces reverse-rotation, then remove the magnets and put brass weights where the magnets where. That change will guarantee that a Display will move only in the direction the motor turns. Second, start with a Display that produces reverse-rotation and remove the Earth's magnetic field. The following several paragraphs provide information that leads to a specific conclusion regarding this matter.

The above question—about stopping a Display from going in the reverse direction—can not be answered by putting brass weights where the magnets were, since such a Display is not capable of reverse-rotation motion. Therefore, we return to the possibility of removing the Earth's magnetic field. That, however, is not easy to do. (Its a bit like removing the law of gravity.) Its present on the Earth, in the Earth, and above the Earth. To isolate it, even for one cubic foot of volume, requires extraordinary measures. From a pragmatic standpoint, the best that can be done is to reduce its magnitude. But how is that done? Well, we are indeed fortunate because there is an area of Earth science where investigators have long used test facilities that are capable of reducing the magnitude of the Earth's magnetic field. The facilities are referred to as "magnetostatic shields." The dictionary defines, "magnetostatic" as, "of, relating to, or being a stationary magnetic field." So the term magnetostatic shield describes a means to protect against a stationary magnetic field, which is, in fact, the Earth's magnetic field. Basically, they are specialized test rooms (say 10 feet by 12 feet) that reduce the field's magnitude. Some people refer to them as "field free rooms," but that's an exaggeration.

Such rooms are necessary for conducting research in paleomagnetism. Paleomagnetism is the study of the direction and intensity of the Earth's magnetic field through geologic time. It is by these studies that past movements of the Earth's tectonic plates are pieced together. Also, reversals in the north-south magnetic poles of the Earth are identified. Results of these studies come from understanding the magnetic history contained in rocks. (See, McGraw-Hill Concise Encyclopedia of Science & Technology, page 1242.) Another source provides additional specific information. The "Sixth Edition of Columbia Encyclopedia" contains the following under the heading of "paleomagnetism": " . . . Geophysicists have been able to trace changes in the orientation of the Earth's magnetic field through geologic time by carefully collecting rock specimens of different ages and determining the alignment of their magnetic fields. That technique has provided a timetable for periods of normal and reverse polarity, showing 171 reversals in the Earth's magnetic field in the past 76 million years . . . " (Present pole arrangement is considered normal.)

These rooms are designed specifically to minimize the Earth's magnetic field. The design is done by experts who also supervise construction. State-of-the-art rooms are rated at levels less than 300 nT. The units are nano Teslas: nano stands for $10^{-9}$, and Tesla is, "a unit of magnetic induction in the mks system equivalent to $10^4$ gauss." Magnetic induction and gauss were defined earlier. A level of 300 nT is about 170 times weaker than the Earth's magnetic field. Here is how these numbers fit together. We start with the magnitude of the Earth's magnetic field—say at mid-latitude in the United States—equal to about 50,000 nT. That's the level outside the room. Inside the room, the magnitude is less than 300 nT. (Yale University and the University of Michigan have rooms that allow testing at levels less than 300 nT. There are other universities that have magnetostatic shields for determining the magnetic histories of rocks. Here are three more that came from a brief survey of these kinds of facilities: Lehigh University; University of Pittsburgh; and Western Washington University.) The ratio of 50,000 nT to 300 nT is about 170:1. Or, put another way, the magnetic induction inside the room is about 0.6% (1/170×100%) of the level outside the room.

Conclusion: It is believed that the Displays presented in this application will never go in the reverse direction if placed in one of these rooms. It is virtually certain an ambient field that is 170 times weaker than the Earth's magnetic field will not permit reverse-rotation.

Here is another bit of information on the above question with regards to preventing a Display from going in the reverse direction. Does the Moon have a magnetic field? Its hard to believe, but it took just one phone call to learn the answer could be found on a NASA website. NASA has a list of questions and answers about the Universe. The following website provided the needed information: http://helios.gsfc.nasa.gov/qa_earth.html#compass. The question on the website asked, " . . . if a compass on the Moon would point toward the Earth."

Answer: "The magnetic field of the Earth only extends about a quarter of the way to the Moon. So the compass wouldn't point at the Earth, and since the Moon has nearly no magnetic field, it wouldn't be much good at all."

There is a bit of uncertainty in the answer due to the words, " . . . the Moon has nearly no magnetic field . . . " Perhaps one day a Display can be tested there to see if it will reverse-rotate.

Another question arose while testing: Is it possible to obtain reverse-rotation motion using only one magnet? The question assumes a two magnet frame would be modified so one magnet would be replaced by, say, a brass weight so the frame would balance. The answer can be arrived at by considering the several forces that are present in a suspended frame that has a single magnet. It may be seen that there will be a build up of torsion in the suspension. Indeed, it is this force that causes reverse-rotation. The force results from an opposition by the magnet to move away from its alignment with the Earth's magnetic field. So, there is no fundamental reason why a one-magnet frame would not reverse-rotate. Therefore, it was not surprising to observe several tests that gave the expected result. However, a one-magnet frame is, really, unimpressive. It barely operates. Like a two cylinder motorcycle running on one cylinder.

By scaling the parameters used successfully in this invention, it may be possible to design a Display that would reverse-rotate a full size Harley-Davidson motorcycle. Why would anyone want to do such a thing? Perhaps the only good answer is, "people at Harley-Davidson may be able to give a reason."

Question: What are the motor speeds that cause reverse-rotation motion? The answer to the question will be given in three parts.

1) Tests showed Displays can be constructed to work with motors that operate from 0.8 rpm up to about 3.0 rpm. In this speed range, there are many combinations of parameters available that give excellent results.
2) Next, the speed range below 0.8 rpm will be considered. At the bottom end is 0 rpm. That, of course, is not practical. But, any motor speed above that will very likely work. However, a speed of 0.1 rpm would seem to have limited usefulness.
3) This leaves the speed above 3.0 rpm. Based on limited testing, parameters must be carefully chosen. It may be possible to design models that work above 10.0 rpm. The upper limit to provide reverse-rotation motion is unknown.

Two other relevant matters:
1) The direction a motor shaft turns does not matter. Reverse-rotation results from motors that turn clockwise or counter-clockwise.
2) All Displays work best in an environment that is free of strong air movement; such as forced air from heating and air conditioning systems, open windows, and open doors.

Evaluation of Suspension Changes for FIG. 1b

A test program was carried out to determine how FIG. 1b would respond to changes in suspension 120. There were two reasons for selecting that particular parameter:
1) previous test results showed it would be a fruitful area to investigate, and
2) it was the easiest parameter to change.

A great deal of testing could be done on FIG. 1b. A systematic evaluation could be made of each of the parameters that follow. And then establishing design guidelines for educational and design purposes. List of parameters:
motor speed
suspension length, diameter, and composition
magnetic induction
distance between magnets
length of frame
weight of rotating portion of FIG. 1b.

For the test program, FIG. 1b was made up of the following:
portable stand 101, (made of ⅝" plywood)
motor assembly FIG. 2
suspension 120, (see test results below)
ball 102
frame 104, (made of wood)
magnets 106

Tests were conducted using four magnets 106. Each was rated at 4200 gauss. Ten different suspensions were used during the tests. Here are the results.

| | | |
|---|---|---|
| suspension length | shortest ⅞", and longest 24" | |
| suspension material | heavy duty nylon thread, white string, steel cable* | |
| summary of results | | |
| most continuous forward rotations | least, 1⅜ | most, 65¼ |
| most continuous reverse rotations | least, ⅝ | most, 34½ |
| cycle time | least, 2.4 min. | most, 68.9 min. |
| fastest forward speed measured | 25:1 (relative to motor) | |
| fastest reverse speed measured | 15:1 (relative to motor) | |
| percent of cycle time that ball 102 was stopped, or moving in reverse direction. | 33% to 45% | |

*This steel cable was used, successfully, to reverse-rotate FIG. 7. It would not, however, reverse-rotate ball 102. FIG. 7 used a longer frame, and stronger magnets. The cable was multi-strand with a diameter 0.037", and a length of 9⅜".

FIG. 10—Flywheel Operation

This section presents a special use of these Displays. It evolved from testing models of FIG. 1A through FIG. 9B. Two design features were combined in a way that allowed an unanticipated new use. By scaling models that had certain characteristics, it was possible to increase rotational speed, and weight. Some of the results were remarkable.

Special aspects of these unusual Displays are:
1) They convert low speed, low power, long term, rotational motion, into high speed, high power, short term, rotational motion.
2) They store mechanical energy.

The amount of energy that could be stored depends, of course, on the Display design. This much is already known: a full size basketball that weighed 2 pounds (including internal frame and magnets) was made to rotate 112 times the speed of its motor. The motor consumed 4.5 watts of electrical power. Such motors are sometimes referred to as "flea power motors." (Note that many night lights use 7 watts of power.) Operating cost for one of these motors for a full day is about 1¢ based on the cost of electrical power in northern Virginia.

Tests were run on a variation of FIG. 1b. It was modified as follows: frame 104 was removed from ball 102. A new frame was constructed. One magnet 516 was placed near each end. Each magnet 516 was recessed in a hole 515. After placing the new frame in ball 102, tests were conducted using suspension 120 that consisted of two side-by-side pieces of heavy duty nylon thread, 9½" long. The motor speed and other features of FIG. 1b were unchanged. Several cycles were run. The average cycle time was 168 minutes. During each cycle, the initial forward-rotation of ball 102 was about 220 continuous rotations. And the initial reverse-rotation was about 156 continuous rotations. Ball 102 made several thousand rotations during each cycle. Forward speeds were measured up to 90 rpm. That corresponds to a ratio of 112:1 over the motor speed of 0.8 rpm. The 90 rpm was steady over 60% of the mid portion of the forward-rotation time. The percent of time for the initial forward-rotation was:
1) 20% moving from 0 rpm to 90 rpm.
2) 60% running at 90 rpm.
3) 20% slowing down from 90 rpm to 0 rpm.

Reverse-rotation speeds were measured up to 60 rpm. That corresponds to a ratio of 75:1 relative to the motor speed.

Similarly, the percent of time for the initial reverse-rotation was:
1) 20% moving from 0 rpm to 60 rpm.
2) 60% running at 60 rpm.
3) 20% slowing down from 60 rpm to 0 rpm.

One interesting observation made during several cycles of this Display involved a noticeable "lifting" of ball 102. Suspension 120 measured 9½" high at the start of each cycle. Just before ball 102 started to rotate forward—that's the time when the Display was storing the maximum amount of energy—suspension 120 measured 8¼" high. The length of suspension 120 had become 1¼" shorter; a decrease of 13%. This caused a "lifting" of ball 102. Such changes in the length of suspension 120 can be used to activate micro switches for charging and running a flywheel. Small pins on top, and bottom, of the flywheel would open and close switches that control electrical power to the motor. In addition, a master control switch would be provided for flywheel operation.

Example: Suppose a version of FIG. 1b requires 100 turns of the motor to cause ball 102 to start rotating. At that instant, the suspension has 100 turns stored over its length. The turning of the frame indicates the torsional force in the suspension has become greater than the sum of the two linear forces from the magnets. In other words, the frame is no longer held captive by the Earth's magnetic field. As the frame rotates, all 100 turns will be used up. In fact, because of inertia, about another 40 turns will be added. And, another 10, or so, will become available from the motor, while this forward-rotation takes place. This means that the frame will rotate about 150 continuous forward turns. The frame will then stop for a few seconds, and begin to rotate in the reverse direction. That's because a negative torsional force exists in the suspension because of the inertia mentioned above. (The inertia of ball 102 is greatest at the time of highest rotational speed—90 rpm. From that time on, momentum carries the ball to a point that is beyond where zero torsion exists in the suspension. It is the momentum of ball 102 that will determine the time required to cause it to stop.) The numbers shown in this paragraph came from actual tests of a model of FIG. 1$b$.

So with this in mind, we now consider one way of using a flywheel to store energy. Let the motor run until just before the frame starts to rotate and then turn the motor off (at about the 98$^{th}$ turn). The Display will be motionless, since 100 turns are required to start the frame rotating. The stored energy comes from the motor. It is manifested as a torsional force in the suspension that is due to an interaction between the magnets and the Earth's magnetic field. With the power to the motor turned off, the Display is in a state of motionless quiescence that can last indefinitely. At this time it is charged to about 98% of capacity. But, even that underestimates the potential to do "real work". That's because an additional 50 turns, or so, will be added once the frame starts rotating—see above.

Let us suppose, based on this, that the motor is turned on. In two rotations of the motor shaft, the frame will start to rotate. (Actually, because of uncertainties, it may take a few turns more or less.) This begins a high speed rotation that could last ten minutes or more. A few turns of the motor would cause the Display to produce about 150 turns of the frame. About 100 of the turns would be at about 100 times the speed of the motor.

Previously, it was mentioned that ball 102 had rotated 112 times faster than its motor. There is no reason to believe the measured 112:1 ratio of rotating ball 102, to the motor speed, was a maximum value. It seems possible to achieve ratios greater than 200:1. Based on what was observed, there are ways to improve flywheel characteristics:

Use a long suspension that has a small diameter. Examples are: nylon cord; steel wire; high strength fishing line, etc.

Use a ball or cylinder to reduce wind resistance. The outside surface should be smooth.

Use a larger ball than the one in FIG. 1$b$. A larger ball allows a longer frame.

Use magnets with greater gauss.

Determine the best motor speed and horsepower.

All of the above characteristics can be optimized. These flywheels operate like the other Displays. They are, however, capable of greater rotational speeds—perhaps more than 200 times the speed of their motor.

Two areas that require additional study and experimentation:

1) suspension material, and
2) flywheel balance

All other design aspects can be scaled from the basic models already discussed.

Suspension material: It is likely that readily available material will work fine. But, finding materials that give high speed and acceptable life expectancy will require more work.

Balance: FIG. 10 shows a cylinder whose top and bottom fit over two internal frames. The cylinder could be 1 to 4 feet in diameter, and it could weigh 5 pounds or more than 100 pounds. Such flywheels could store considerable energy. And they need excellent balance. In that regard, there is a special concern with these flywheels: they hang from a flexible suspension. There are two ways to make them run without difficulty. First, they need to be properly balanced by using techniques similar to spin balancing an automobile tire. Second, they need to have an arbor mounted under the cylinder in line with the suspension. This arbor would fit into an external recess that contained two low friction bearings separated, vertically, by several inches. This would eliminate undesirable off axis flywheel motion.

Rotational power could be extracted using the arbor just described. That would be possible by extending the arbor past the two bearings to a clutch and gear box. Power would be coupled out after the flywheel had reached a predetermined speed.

Student Exercises Using FIG. 12

Below are two exercises that can greatly expand students' knowledge of rotational motion and magnetism. The exercises build on what was learned about the preferred embodiment, FIG. 1A, and the other Displays. The first exercise involves the top half of FIG. 12; all of FIG. 12 is used for the second exercise.

Both exercises are quite demanding. Many hours would be required to do a thorough job on each one. It would be realistic to assume that some of the work would be done by one class, and additional work by other classes. One important consideration involves preparing reports of work done. Reports should show clearly the progress made: They should include drawings, graphs, conclusions, etc.

First Exercise—Using the Top Half of FIG. 12

The first exercise requires building models and testing them. Its scope is quite broad. The objective is stated below.

Here are the steps needed to construct the test model for the first exercise. See FIG. 12.

1) Suspension 1202 should be 6" long, and made of 4 pieces of side-by-side heavy duty nylon thread, or equivalent material.
2) Frame 1204 should be 12" long×1½" high×½" thick, and made of wood. Cord 1206 is positioned at the mid-point of the frame.
3) Holes 105 should be ½" diameter and ⅜" deep. Their location on frame 1204 should be ¾"; 2"; and 3¼" from each end. These locations minimize undesirable mutual coupling between magnets.
4) Magnet 106 dimensions are ½" in diameter and ⅜" thick.

The first exercise will now be presented. Its purpose is to carefully investigate the behavior of frame 1204.

Objective: Find the range of each of the characteristics below that produces reverse-rotation motion. (One important difficulty will become apparent soon after testing begins: Some of the characteristics are interrelated.)

| element | characteristic |
|---|---|
| motor | speed, rpm |
|  | cw and ccw rotation |
| suspension | length |
|  | diameter |
|  | composition |
| frame | length |
|  | composition |
| magnets | gauss |
|  | number of magnets |
|  | distance from center of frame |

Second Exercise—Using all of FIG. 12

This exercise consists mainly of theoretical analysis. It is intended for advanced college students, and those in graduate school. All of FIG. 12 is used in this exercise. Construct the top part of FIG. 12 using the steps listed under the first exercise.

The construction of the bottom half of FIG. 12 should follow the directions used for the top half Suspensions 1208 and 1202 should be identical—they have different numerals to avoid confusion. There is one primary objective for this exercise, it is stated below.

The exercise depends on the positioning of magnets 106 in frames 1204 and 1210. Start with frame 1204. Put 3 magnets 106 in the 3 holes 105 on one end of the frame making certain their north-seeking poles all face the same way. Now, put 3 magnets in the other 3 holes, and make certain their north-seeking poles all face the opposite direction of the first 3. Using FIG. 12 as a guide, hang frame 1204 under suspension 1202. Only the top half of FIG. 12 is used for this part. (See General note #1 on page 14.)

Next, apply electrical power to motor 226 (FIG. 2). It only takes a few minutes to observe that frame 1204 only rotates in the forward direction. In fact, if a person watched the frame for several hours, the same forward motion would be seen. The frame will never stop. Hence, it will never reverse-rotate.

Now put frame 1210 in place as shown on FIG. 12. Cord 1212 is positioned at the mid-point of the frame. No magnets are to be included in frame 1210 at this time. Frame 1204 has 6 magnets; frame 1210 has none. Again, in just a few minutes it will be seen that both frames now always go forward. Neither will ever stop. The next step involves adding magnets 106 to the holes 105 in frame 1210. Make certain both magnets have their north-seeking poles on the same side of frame 1210. With FIG. 12 complete, and motor 226 running, it should be possible to see the following within about 15 minutes:

Frame 1210 will stop and then move in the reverse direction.

Frame 1204 will stop and move in the reverse direction but not very far.

These reversals should repeat at regular time intervals. If the above motion is not observed, change the lengths of suspension 1202 and 1208. A shorter length of each results in faster cycle times. That speeds up the number of times the frames will stop and reverse direction in a given time period.

The above can be summarized as follows:

When frame 1210 has no magnets, frame 1204, as configured above, will never stop.

When frame 1210 has magnets, frame 1204 does stop and move in the reverse direction.

Objective: Use the best available theoretical methods to find the answer to the question below.

Given: FIG. 12 as constructed immediately above. Magnets 106 are rated at 4200 gauss each. Magnetization is through the thickness of the magnets and the poles are located on the flat surfaces.

Question: What is the critical ratio of gauss-inches in frame 1204, to gauss-inches in frame 1210? Where critical ratio is the ratio which causes frame 1204 to stop, periodically, but not go in the reverse direction. And gauss-inches is defined as the product of: Total gauss on a frame times the mean distance between magnets in inches. Example:

Consider frame 1210 with one magnet 106 on each end as shown on FIG. 12.

$$\text{gauss-inches} = 2 \cdot 4200 \text{ gauss} \cdot \left(12'' - \frac{3''}{4} - \frac{3''}{4}\right)$$
$$= 8400 \cdot 10\frac{1''}{2}$$
$$= 88{,}200 = 8.82 \times 10^4$$

Coulomb's Law

There are many useful relationships available for analyzing magnetic forces. However, one of the most promising for understanding these Displays should be Coulomb's law. It is of fundamental importance when calculating the force that exists between magnets. Students need to be guided in the dual nature of the application of Coulomb's law. Of special interest here is the use of the law as applied to magnetostatics. Theory and problems that involve the use of the law for electromagnetism will not benefit students learning about these Displays. Charles Coulomb (1736-1806) published the law in 1785 after experimental investigations. However, Henry Cavendish (1731-1810) discovered the same law some years earlier, but he did not publish his work. Records of Cavendish's experiments became known after Coulomb published his results. See, Encyclopedia Britannica.

General Rules Regarding Display Operation

Below are rules that came from observations. They are believed to be accurate. FIG. 12 should be used as a reference. However, the rules or variations of these rules are expected to apply in general.

Rule 1. If frame 1204 is the only frame involved, it will always move forward if there are no magnets on the frame.

Rule 2. The same result as seen in Rule 1 will exist if frame 1210 is added below frame 1204 with no magnets.

Rule 3. Frame 1204, by itself, will reverse-rotate if one magnet 106 is put in any hole 105. Rotation will be weak in the reverse direction.

Rule 4. Frame 1204, by itself, will produce reverse-rotation if one magnet 106 is put in any of the 3 holes on one side of the frame, and another magnet 106 is added to the other side. The magnets must have their north-seeking poles on the same side of the frame.

Rule 5. Continuing Rule 4, more magnets with their poles properly aligned will produce increasingly greater reverse-rotation motion.

Rule 6. If frame 1204 exhibits reverse-rotation motion, and frame 1210 is added with no magnets, both frames will reverse-rotate.

Rule 7. If frame 1204 has no magnets, and frame 1210 has magnets that are properly positioned—one, or two, on each end of the frame, and north-seeking poles on the same side of the frame—both frames will reverse-rotate.

Rule 8. If frame 1204, by itself, produces reverse-rotation motion, and, frame 1210, by itself, produces reverse-rotation motion, the two together will produce reverse-rotation motion.

Rule 9. Frame 1204, by itself, that has one magnet 106 on each end of the frame, and in symmetrical holes, will always go forward if the north-seeking poles are on opposite sides of the frame. This rule holds true if more magnets are added that have the same pole pattern.

Rule 10. The above rules can be adapted to Displays that have 3, or more, frames.

Although the description above contains many specificities, these should not be construed as limiting the scope of the invention but as merely providing illustrations of some of the present embodiments of this invention. For example, Displays can be designed to provide unexpected motion for the benefit of persons, who, because they are elderly or disabled, or for other reasons, are confined to nursing homes, or hospitals, etc. Such Displays can be made to allow easy and quick installation. They could rotate one or more independently mounted vertical cylinders that would show artwork, or photographs of animals, trees, mountains, etc. The designs of several of the figures could be adapted to accomplish the previous suggestions (for example, FIG. 8A and FIG. 8B). In addition, Displays can contain frames that have more than two ends. One frame tested had 8 ends, spaced at 45°; it worked fine.

What is claimed is:

1. A rotation apparatus for teaching principles of science, comprising:
    a low-speed motor;
    a shaft coupled to the low-speed motor, wherein the low-speed motor rotates the shaft in a first direction;
    a frame member;
    means for coupling the frame member to the shaft, such that the frame member is suspended from the shaft, wherein the means for coupling comprises a flexible suspension; and
    at least one rare earth magnet coupled to the frame member, wherein when the low-speed motor rotates the shaft in the first direction the at least one rare earth magnet causes the frame member to alternately rotate in the first direction and in a second direction opposite the first direction.

2. The rotation apparatus of claim 1, further comprising an object coupled to the frame member, wherein when the frame member alternately rotates in the first direction and in the second direction the object rotates with the frame member.

3. The rotational apparatus of claim 2, wherein the frame member is disposed within the object.

4. The rotational apparatus of claim 2, wherein the object comprises a ball.

5. The rotational apparatus of claim 2, wherein the object comprises an article of clothing.

6. The rotational apparatus of claim 2, wherein the object comprises a flywheel.

7. The rotational apparatus of claim 1, wherein the at least one rare earth magnet comprises a plurality of rare earth magnets, and the frame member has a plurality of openings formed therethrough, and each of the plurality of rare earth magnets are disposed within a corresponding one of the plurality of openings.

8. The rotational apparatus of claim 7, wherein each of the plurality of rare earth magnets comprises a north-seeking pole end and a south-seeking pole end, and the north-seeking pole end of each of the plurality of rare earth magnets are aligned with each other.

9. The rotational apparatus of claim 1, wherein the means for coupling further comprises:
    a first hook connected to each of the shaft and the flexible suspension; and
    a second hook coupled to each of the flexible suspension and the frame member.

10. The rotational apparatus of claim 1, wherein the low-speed motor rotates the shaft at a constant speed, and a rotational speed of the frame member varies during the rotation of the shaft.

11. The rotational apparatus of claim 1, wherein the frame member is non-magnetic.

12. The rotational apparatus of claim 11, wherein the frame member comprises wood.

13. The rotational apparatus of claim 1, wherein the low-speed motor comprises a hysteresis motor.

14. The rotational apparatus of claim 1, further comprising a pair of removable, non-magnetic side stands, wherein the frame member is positioned between the pair of removable, non-magnetic side stands.

* * * * *